(12) United States Patent
Cioanta et al.

(10) Patent No.: US 11,072,997 B2
(45) Date of Patent: Jul. 27, 2021

(54) SHOCK WAVES FOR OIL SEPARATION

(71) Applicant: SANUWAVE, INC., Suwanee, GA (US)

(72) Inventors: Iulian Cioanta, Milton, GA (US); Cary McGhin, Sugar Hill, GA (US)

(73) Assignee: SANUWAVE, INC., Suwanee, GA (US)

( * ) Notice: Subject to any disclaimer, the term of this patent is extended or adjusted under 35 U.S.C. 154(b) by 0 days.

(21) Appl. No.: 16/365,808

(22) Filed: Mar. 27, 2019

(65) Prior Publication Data

US 2019/0218889 A1    Jul. 18, 2019

Related U.S. Application Data

(62) Division of application No. 15/784,508, filed on Oct. 16, 2017, now Pat. No. 10,378,314, which is a
(Continued)

(51) Int. Cl.
| | |
|---|---|
| *E21B 37/00* | (2006.01) |
| *E21B 28/00* | (2006.01) |
| *C09K 8/58* | (2006.01) |
| *C09K 8/52* | (2006.01) |
| *E21B 41/00* | (2006.01) |
| *E21B 43/00* | (2006.01) |
| *E21B 43/26* | (2006.01) |
| *E21B 7/24* | (2006.01) |
| *C02F 1/36* | (2006.01) |
| *C02F 1/34* | (2006.01) |
| *C02F 1/40* | (2006.01) |
| *C02F 101/32* | (2006.01) |
| *C02F 103/10* | (2006.01) |
| *C02F 103/36* | (2006.01) |

(52) U.S. Cl.
CPC ............... *E21B 37/00* (2013.01); *C09K 8/52* (2013.01); *C09K 8/58* (2013.01); *E21B 7/24* (2013.01); *E21B 28/00* (2013.01); *E21B 41/00* (2013.01); *E21B 43/003* (2013.01); *E21B 43/26* (2013.01); *C02F 1/34* (2013.01); *C02F 1/36* (2013.01); *C02F 1/40* (2013.01); *C02F 2101/32* (2013.01); *C02F 2103/10* (2013.01); *C02F 2103/365* (2013.01); *C02F 2303/04* (2013.01); *C02F 2303/22* (2013.01)

(58) Field of Classification Search
CPC .............. B01D 21/009; B01D 21/0006; B01D 21/0012; B01D 21/0084; B01D 21/283; E21B 28/00; E21B 37/00; E21B 41/00; E21B 43/003; E21B 21/063
See application file for complete search history.

(56) References Cited

U.S. PATENT DOCUMENTS

| | | | |
|---|---|---|---|
| 4,655,846 A * | 4/1987 | Scharton ................. | F28G 7/005 134/1 |
| 8,988,972 B1 * | 3/2015 | Woodall ............... | G10K 15/043 367/142 |
| 2007/0144785 A1 * | 6/2007 | Smith ..................... | E21B 43/40 175/66 |

FOREIGN PATENT DOCUMENTS

KR           1316025 B1 * 10/2013

* cited by examiner

*Primary Examiner* — Zakiya W Bates
(74) *Attorney, Agent, or Firm* — Polsinelli PC

(57) ABSTRACT

A pressure shock wave apparatus applies shock waves to separate substances, such as oil, from a water mixture in an enclosure. The substance, such as oil, is moved toward a substance removal conduit and the water moved toward a water conduit from action of the shock wave apparatus.

20 Claims, 34 Drawing Sheets

Related U.S. Application Data division of application No. 14/739,532, filed on Jun. 15, 2015, now abandoned, which is a division of application No. 13/866,134, filed on Apr. 19, 2013, now Pat. No. 9,057,232.

(60) Provisional application No. 61/810,858, filed on Apr. 11, 2013.

SHOCK WAVES FOR OIL SEPARATION

CROSS REFERENCE TO RELATED APPLICATIONS

The present application is a divisional of U.S. patent application Ser. No. 15/784,508, filed Oct. 16, 2017, which is a divisional of U.S. patent application Ser. No. 14/739,532, filed Jun. 15, 2015, which is a divisional of U.S. patent application Ser. No. 13/866,134, filed Apr. 19, 2013, now U.S. Pat. No. 9,057,232, which claims benefit of priority of U.S. Provisional Application No. 61/810,858 filed Apr. 11, 2013, all of which are herein incorporated by reference.

BACKGROUND AND SUMMARY OF THE INVENTION

In general, it was noticed all over the world that after earthquakes there were changes in the aquifer and in output of the production fields. The earthquakes produce shock waves that are propagating hundreds of miles away from the epicenter. Systematic observations collected from Russian oil fields showed that after earthquakes an increased oil production was recorded. Changes in oil production continued for periods that ranged from several months to three years after the earthquake. This represents clear evidence that the shock waves can play a role in the oil industry.

Shock waves were studied from the beginning of the $20^{th}$ century for military, medical and civilian applications. The use of shock waves in non-destructive applications was focused towards the middle of the century for the use in the medical field in order to destroy kidney stones from outside the body (extracorporeal treatment). These new devices were invented in Germany and they were called lithotripters. The first lithotripters used the electrohydraulic principle to produce shock waves, which is based on high voltage discharge in between two electrodes submerged in water. The high voltage discharge vaporizes the water and produces a plasma bubble that grows very fast and collapses violently, producing a shock wave that is focused via a reflector towards the desired area. The transformation of the high voltage electric energy into kinetic energy of the shock waves is efficient and proved very beneficial for different medical fields as urology, orthopedics, wound care, etc. After development and commercialization of the electrohydraulic lithotripters, new methods of producing shock waves were researched and implemented based on the electromagnetic or piezoelectric principles.

The idea of using shock waves inside the oil fields started to be incorporated in patents in the late fifties (U.S. Pat. No. 2,871,943) up to now. All these patents describe different constructions to produce seismic waves or the electrohydraulic shock waves that are generated using the high voltage discharge in between two opposing electrodes (known also as spark gap principle—see U.S. Pat. Nos. 4,074,758, 4,169,503 and 6,427,774 B2). The seismic shock waves are difficult to produce and have unpredictable effects on other earth structures, water beds, etc. and can generate uncontrollable environmental issues. The shock waves produced using large magnitude explosive means are also difficult to implement and control, although they produce enough energy to stimulate oil field production.

The electrohydraulic shock waves produced via spark gap electrodes, have problems with maintaining the desired distance between the two electrodes in order to be able produce persistent shock waves (see U.S. Pat. Nos. 4,074,758, 4,169,503 and 6,427,774 B2). The electrodes during high voltage discharge are consumed due to high heat, chemical reactions and corrosion. To address these challenges super alloys were used for the electrodes, which can prolong their life. However, the shock waves devices need to be used for days and weeks, which will require numerous exchanges of the electrodes that make this solution not feasible for field applications. Different feeding mechanisms for electrodes to offset the electrodes consumptions were employed in other patents, with complicated feeding systems and controls, which makes these systems expensive and unpractical too (see U.S. Pat. No. 6,427,774 B2).

Furthermore, a combination of electrohydraulic and electromagnetic generators that produce both acoustic vibration and electromagnetically-induced high frequency vibrations were described in U.S. Pat. No. 6,427,774 B2. The purpose of this dual method is to enhance oil stimulation by overlapping shock waves with electromagnetic waves. The electrohydraulic shock waves described in this patent are generated using spark gap electrodes as well.

Shock waves were also described of being produced using hydraulic means in U.S. Pat. No. 8,113,278 B2. However, these shock waves are radial in nature and are neither focused nor unidirectional, which reduces their efficiency.

The inventions from this patent relate to other ways to produce shock waves utilizing either one or more laser sources, or a self-generated combustible gas supply, or a micro-explosive pellet, and piezocrystals or a piezofiber composite configuration. All of these new approaches are able to offer a high longevity of the shock waves devices, which fits the needs of the oil industry applications.

The shock waves devices can be used in oil industry processes as follows:
- Creating an unidirectional and targeted/focused pressure field inside the oil/gas field;
- Reducing the drilling time by cracking the rock in front of the drilling head;
- Dropping oil viscosity and creating coalescence of small drops of oil due to pressure gradients generated by shock waves;
- Enhancing the existing oil extraction technologies, as an adjunct method/process;
- Increasing efficiency of the fracking technology;
- Reducing the amount of water and high pressures necessary for fracking;
- Cleaning and reuse of water used for fracking process, which contributes to environmental protection and reduced costs;
- Applying it as independent technology for Improved Oil Recovery (IOR) and/or Enhanced Oil Recovery (EOR)
- Operating in combination with other technologies for IOR and/or EOR
- Unplugging clogged pipes, oil wells, etc. by eliminating the scales, paraffin and asphaltene formation from inside the pipes/bores;
- Unblocking oil pipes that form ice plugs in the arctic regions;
- Cleaning the unpiggable pipes for oil transportation or processing installations, through internal or external approaches (depending on the access to the pipes);
- Separating of water and solid particulates from extracted oil;
- Cleaning continuously the membranes used on the oil processing installation for increased productivity and elimination of down times.

It is an objective of the present inventions to provide shock wave generating devices that are modular, do not need high maintenance and can, if needed, be used in conjunction with other oil drilling or oil extraction equipment without the need of expanding the well bore diameter or removing the device during drilling or oil extraction.

Furthermore, the shock waves devices employed in oil industry should be high energy devices capable of producing strong shock waves that can penetrate the desired area for long distances and be able to crack the rock formation present in the targeted zone. One or more shock waves devices can be used, which can be placed in one or more well-bores, depending on specifics for each oil field.

The shock waves produced by the proposed devices will have a compressive phase (produces high compressive pressures) and a tensile phase (produces cavitation bubbles that collapse with high speed jets) during one cycle of the pressure pulse. This two synergetic effects work in tandem by acting at macro (compressive phase) and micro level (cavitation jets of the tensile phase), which is enhancing the effects of the shock waves on the well structure and oil incorporated in it.

The shock wave pulses are made up of frequencies ranging from 100 kHz to 20 MHz and will generally have a repetition rate of 1 to 20 Hz. The repetition rate is limited by cavitation, which represents the longest time segment (hundreds to thousands of microseconds) of the pressure pulse. In order to not be negatively influenced by the new coming pulse, the cavitation bubbles need sufficient time to grow to their maximum dimension and then collapse with high speed jets that have velocities of more than 100 m/s. These jets play an important role in cracking the rock, opening pores and making the oil more fluid. Thus, the shock wave pulses that have a high repetition rate can interfere with one another and negatively affect the cavitation period, hence reducing the desired effect of the shock waves.

DETAILED DESCRIPTION OF THE INVENTION

Figure 1:
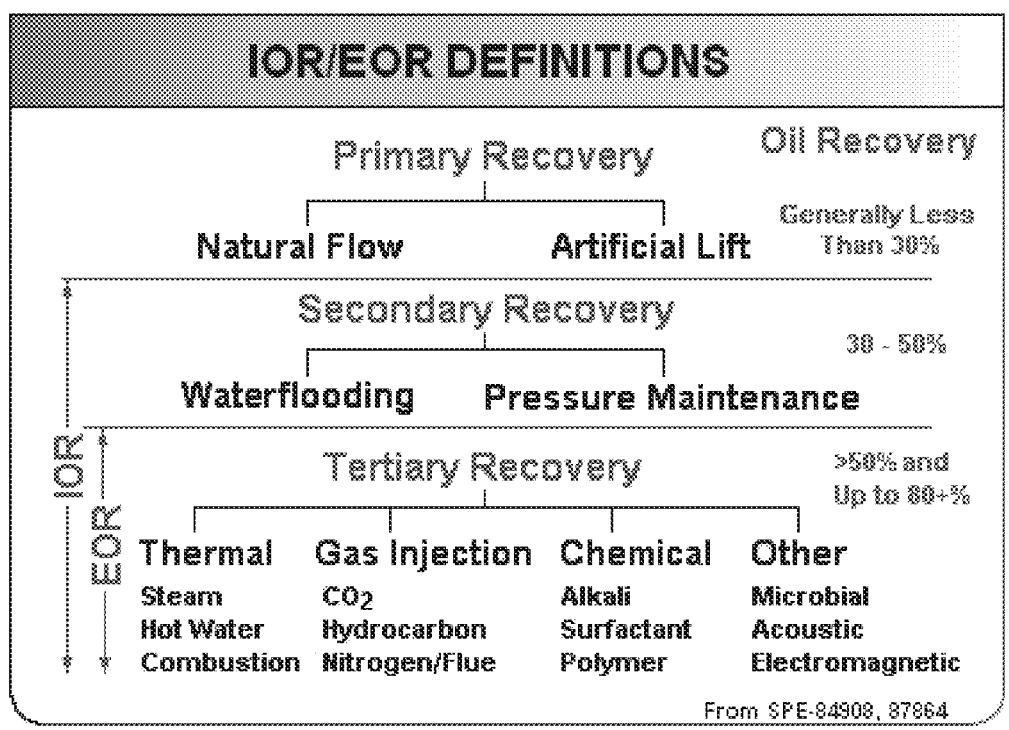
FIG. 1 is a description of the oil and gas recovery stages and the technologies associated with each of them.

The inventions relate to devices and methods for oil exploration, primary oil exploitation known as primary recovery, secondary oil exploitation known as improved oil recovery (IOR) and tertiary oil exploitation known as enhanced oil recovery (EOR), as presented in FIG. 1, by utilizing various means to generate a shock wave into a liquid mixture surrounding the oil bearing well. Furthermore, the invention provides shock waves devices that can be used for the maintenance of the oil infrastructure and cleaning of residual waters and oil spills byproducts. As used in this specification the term "oil" often called "crude oil", means natural oil or petroleum, which consists mainly of hydrocarbons.

In general, the inventions described in this patent, which are using high energy acoustic pressure waves, can be applied to vertical or horizontal well bores, for any existing type of oil and gas exploitation, maintenance or transport/distribution infrastructure, for shore and offshore installations, for any type of oil (heavy, medium or light crude oils) and any type of natural gas, for mature and new fields, for any type of rock/stone or sand or shale structure, for deep and shallow reservoirs, as independent mobile/portable or fixed technology or in conjunction with other existing technologies that are currently used in oil and gas industry, without any limitations.

The inventions summarized below and defined by the enumerated claims are better understood by referring to the following detailed description, which should be read in conjunction with the accompanying drawing. The detailed description of the particular embodiment, is set out to enable one to practice the invention, it is not intended to limit the enumerated claims, but to serve as a particular example thereof.

Primary Oil Recovery

Primary oil recovery, as presented in FIG. 1, refers to the first stage of the oil exploitation when the pressure from the oil field is enough to get the oil into the well bore, which allows the oil to flow by itself to the surface or later on during exploitation oil pumps may be required to move the oil accumulated in the well bore to the surface.

Enhanced Well Drilling

The speed to get to the oil reservoir is a major economic incentive for finding new solutions to drill faster. Oil drilling uses water, which represents the perfect media for shock waves formation and propagation at speeds of 1500 m/s, which practically means that their action can be instantaneously found in front or lateral to a well bore drilling head. This is why the enhanced drilling productivity can be obtained by using shock wave devices incorporated in the drilling head.

During drilling different types of rocks, mud, sand, etc. can be encountered, which have distinctive acoustic properties that make the acoustic shock waves to travel at dissimilar speeds in materials that have different acoustic properties. Thus, the difference in acoustic speed between water (c=1500 m/s) and solids (rocks or mud or sand, etc.) (c=4800-9200 m/s) creates tensile and shear stresses, which can open cracks in the solid matter making the drilling for oil more efficacious and faster. Even more, the cavitation activity produced by the shock waves can enlarge the cracks and can increase the efficiency of the drilling process.

Figure 2:
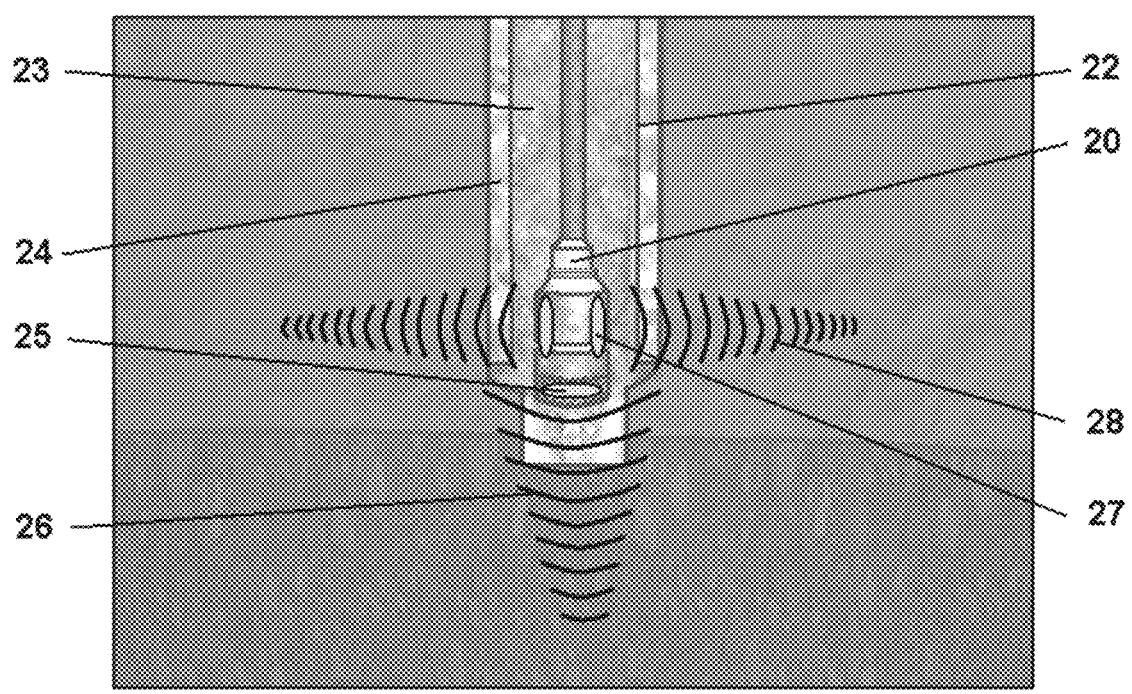
FIG. 2 is a diagram of the use of shock wave devices in tandem with drilling heads for land oil exploration.

The embodiment of FIG. 2 shows a drilling head 20 that incorporates a frontal shock wave device 25 and multiple lateral shock wave devices 27. The frontal focused shock waves 26 applied on the longitudinal axis of the well bore 22 for increased efficiency. Lateral focused shock waves 28 are used to clean the well bore wall 24 and to prevent clogging with rock/sediment fragments resulted from drilling. In FIG. 2 the drilling fluid 23 is a water/mud mixture as used in conventional land oil drilling.

Figure 3:
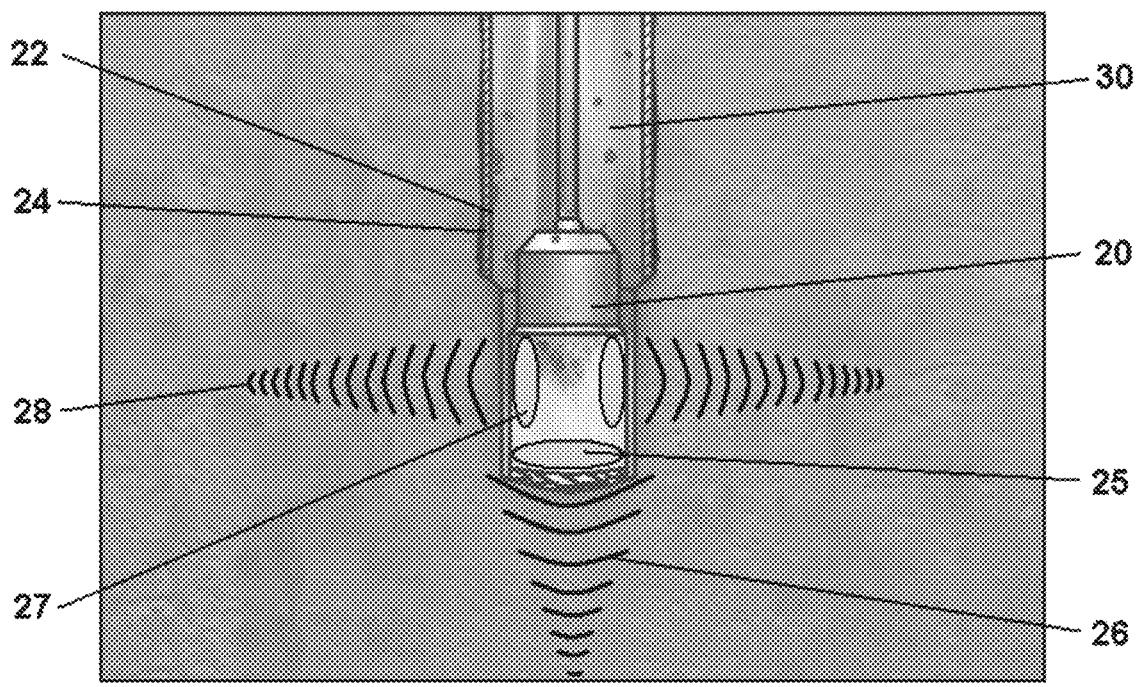
FIG. 3 is a diagram of the use of shock wave devices in tandem with drilling heads for sea oil exploration.

The embodiment of FIG. 3 shows a drilling head 20 used for undersea oil drilling. The drilling head 20 incorporates a frontal shock wave device 25 and multiple lateral shock wave devices 27. The frontal shock wave device 25 produce frontal focused shock waves 26, for increased efficiency in drilling of the well bore 22. The lateral shock wave devices 27 produce lateral focused shock waves 28, for cleaning the well bore wall 24 and to prevent clogging. In FIG. 3 the drilling fluid is sea water 30.

Although the drilling heads 20 that incorporate shock wave devices 25 or 27 are more complicated, the drilling efficiency may off-set this drawback. Also, the shock waves devices 25 or 27 should last for long service life and should have a rugged construction, to function in harsh environment (vibrations, heat, corrosion, etc.). This is why unconventional methods to produce focused or non-focused shock waves that utilize lasers (as presented in FIG. 7 and FIG. 8), or combustion gases (as presented in FIG. 10), or piezo-fibers (FIG. 14), or pressurized fluids, etc., are needed.

Oil Artificial Lift

After well bore drilling and preparedness of the well for production, a very important activity is the extraction of the oil from the reservoir. This is accomplished via pumps with different efficiency and principle of operation. During primary well recovery through natural flow and artificial lift usually up to 30% of the oil and gas reserve from the ground are extracted (see FIG. 1). The oil artificial lift pressurizes the oil from the reservoir in order to travel to the surface. Shock waves can play a role in this activity by increasing the oil pressure down the well bore 22 in addition to the pressure created by oil pumps. The shock wave devices 45 can be attached to the pumps that are submerged into well bore 22, as seen in FIG. 4 and FIG. 5, to enhance pumping efficiency.

Figure 4:
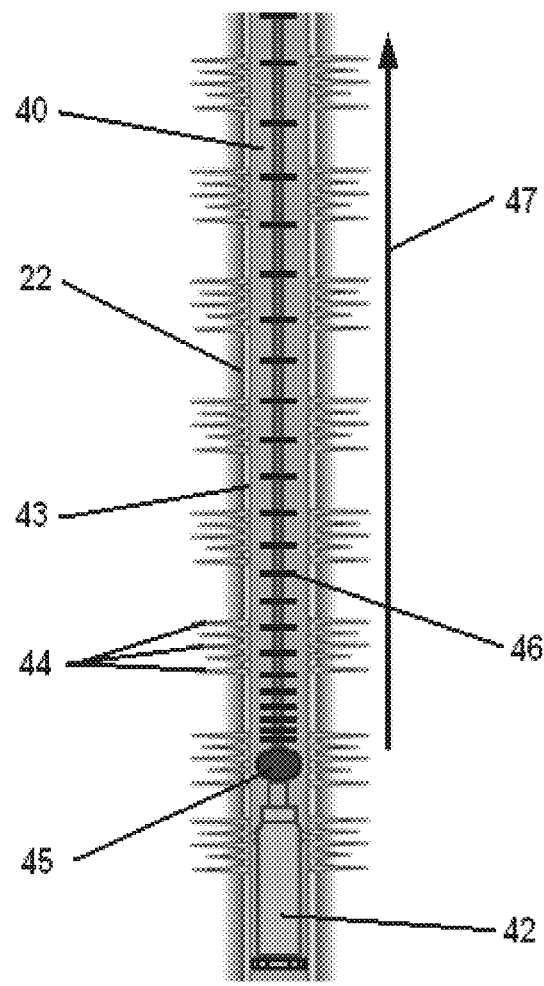
FIG. 4 is a diagram of the use of shock wave devices above oil pumps in order to speed-up oil pumping from the well bore towards surface.

During primary oil recovery, as can be seen in FIG. 4, the oil 40 gets into well/production bore 22 via casing/metal production liner 43 from reservoir perforations 44. This transport is given by the pressure in the oil reservoir 60 (see FIG. 6), which differs for each oil exploitation field. However, the reservoir pressure is not all the time enough (especially towards the end of the primary recovery period) to move the oil 40 up to the surface 62 (see FIG. 6). This is why special designed oil pumps 42 are used to pump the oil 40 from the oil reservoir 60. In FIG. 4 the shock device 45 is placed above the oil pump 42, which allows the usage of directional planar shock waves 46 to speed-up the moving of the oil 40 from well/production bore 22 towards the surface. The shock waves direction 47 towards the surface 62 (see FIG. 6) allows an additional increase in the normal pressure generated by the oil pump 42, which can speed-up the extraction process.

Figure 5:
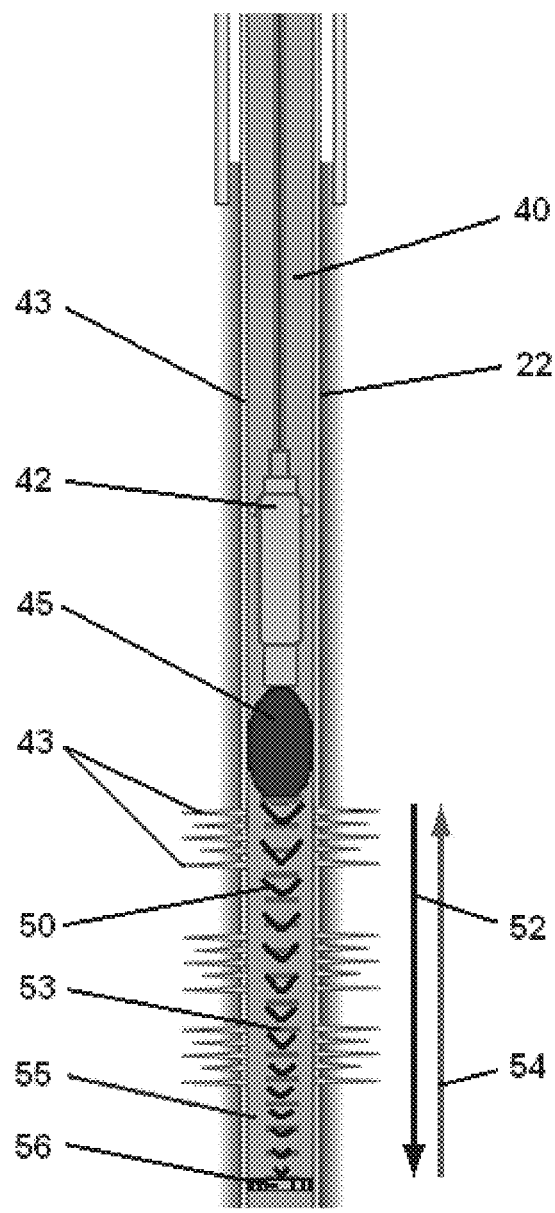
FIG. 5 is a diagram of the use of shock wave devices below oil pumps in order to speed-up oil pumping from the well bore towards surface.

In FIG. 5 the shock device 45 is placed below the oil pump 42. The shock device 45 is designed in such way that creates a relatively enclosed volume between the oil pump 42 and the reflective plate 56. This enclosed volume coincides with the height of the oil reservoir 60 (see FIG. 6) where the oil 40 gets into well/production bore 22 via casing/metal production liner 43 from reservoir perforations 44. Placement of the shock wave device 45 below the oil pump 42 generates focused shock waves 50 in this enclosed volume that are moving downward, per focused shock wave direction 52. Due to reflection of the focused shock waves 50 on the reflective plate 56, new reflected planar shock waves 53 are created that are moving upward in the enclosed volume, per reflected planar shock waves direction 54.

Based on the traveling distance the timing of the shock waves repetition (frequency) can be calculated to not create interference between focused shock waves 50 and reflected planar shock waves 53. This bouncing of the shock waves 50 and 53 increases the pressure inside the enclosed volume, which helps the oil pump 42 to move the oil 40 towards surface 62 (see FIG. 6). Furthermore, the fact that the oil pump 42 can be placed in a position closer to the surface 62, above the oil reservoir 60, reduces the extend of the column height of fluid that needs to be pumped and thus the work load of the oil pump 42, which makes the oil pumping more efficient.

Secondary and Tertiary Oil Recovery

According to FIG. 1 the secondary and tertiary oil recovery are also known as Improved Oil Recovery (IOR) and/or Enhanced Oil Recovery (EOR). The difference between IOR and EOR is given by the mechanism of action. IOR is concentrated on creating and propagation of fractures in a rock layer, which allows the oil from the reservoir 60 to flow towards the well/production bore 22 (see FIG. 6). On the other hand EOR is focused on changes in oil/fluid flow characteristics and to increase rock permeability through increased porosity to allow the trapped oil to coalesce and flow out of the rocks in order to be collected and pumped out of the oil reservoir 60. According to FIG. 1, IOR is clearly a secondary recovery method and can go into the tertiary recovery period, where it can overlap with EOR that is the distinctive/characteristic method employed for tertiary recovery (the last stage of oil recovery). According to FIG. 1, after primary; secondary and tertiary recovery up to 80% of the resources found in the oil/gas reservoir 60 can be recovered.

Water Flooding/Fracking or Improved Oil Recovery (IOR)

Water flooding or hydraulic frocking or Improved Oil Recovery (IOR) method represents a technology/process used in oil and gas industry that produces the propagation of fractures from a well bore 22 drilled into oil reservoir 60 rock formations (see FIG. 6), by using a pressurized fluid. Frocking represents a technique used to release petroleum, natural gas (including shale gas, tight gas, and coal seam gas), or other substances for extraction, which is capable of getting an additional 20% of the oil and gas reserve, on top of the 30% recovered during primary recovery (see FIG. 1). The science behind fracturing is based on consideration of the mobility of the fluids. If mobility ratio between water and oil is less than 1, then oil is capable of travelling at a rate equivalent to the injected water during tacking process. An increase in the viscosity of the oil would mean that mobility ratio is greater than 1 and would lead to the injected fluid having poor miscibility with the oil. This would also make it harder for the oil to penetrate the rock porosity. In other words, when mobility ratio between water and oil is greater than 1 the displacing fluid (water) has greater mobility than the displaced fluid (oil). To improve the mobility ratio (reduce water mobility) during fracking, the viscosity of the water has to be increased, via gas injection, adding miscible solvents or polymers, etc., to lower the interfacial tension between oil and water and thus removing the interface between oil and water.

The usage of shock waves for water flooding or hydraulic fracking or Improved Oil Recovery (IOR) is based on the following:

During propagation through a rock surrounded by a fluid, acoustic shock waves are transmitted and reflected at the rock's boundaries, resulting in shear and tensile stresses that contribute to rock fragmentation. This phenomenon is given by the difference in acoustic speed between water (c=1500 m/s) and solids/rocks (c=4800-9200 m/s) that creates tensile and shear stresses in rock and between the boundary layer of the oil and rock, which helps with fragmentation and moving the fluid through the oil reservoir 60 (see FIG. 6).

Figure 6:
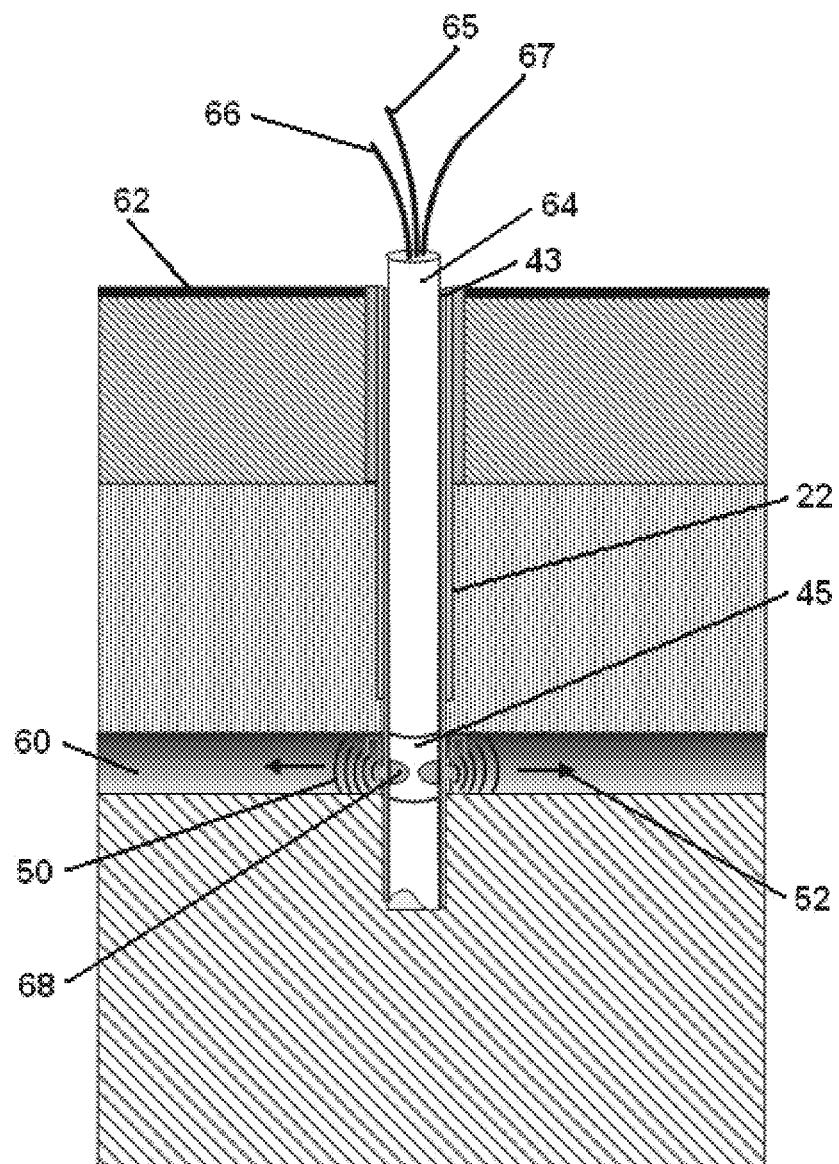
FIG. 6 is a diagram of the basic configuration of the tool as deployed into the production section of the well bore casing. Different stratified layers of the subterranean soil are depicted (not to scale).

The ability to adjust penetrations and intensity of the shock waves allows them to initiate and sustain the propagation of fractures starting from "near field" around the well bore 22 to "far field" deep down into the oil reservoir 60 (see FIG. 6).

Shock waves can produce significant pressure gradients on their path, which practically allows the local pressurization of water inside the oil reservoir 60, without using very high pressure water generated from the surface 62 (see FIG. 6). This can translate in significant reduction in volume and pressures of water used during fracking, with significant financial and environmental benefits.

Using shock waves can also help with the miscibility of water with oil, which can improved the fluids mobility during fracking, without addition of gas, solvents or polymers to the water. This can have significant implications in elimination or reduction of the percentage of additives/pollutants from the fracking water, which can reduce the environmental impact of the fracking process.

Shock waves generate high pressures and cavitational activity, which can kill microbes that are found in the oil reservoir 60 (see FIG. 6). The antimicrobial activity of the shock waves will reduce the contamination/bioburden of the water used during fracking or water flooding process, with significant financial and environmental benefits.

Enhanced Oil Recovery (EOR)

The residual oil that cannot be extracted from the well using conventional oil pumping equipment, or by water or gas infection (known as a secondary recovery methods), require tertiary methods otherwise known as EOR (enhanced oil recovery). The following mechanisms are thought to be responsible for enhanced oil recovery (EOR) based on the changes in fluid flow characteristics resulting from shock waves stimulation:

Changes in Wettability. Some laboratory work indicates that the wettability of a core saturated with oil can be made more water wet, resulting in increased oil recovery rate by water flooding in conjunction with seismic/shock waves stimulation.

Coalescence and/or dispersion of oil drops. This school of thought speculates that attractive forces acting between oscillating droplets of one liquid in another (Bjerknes forces) induce the coalescence of oil drops, enabling continuous streams of oil to flow.

Reduced viscosity. Laboratory work has indicated that, immediately after a 30 to 60 minute long exposure to an acoustic field, oil viscosity dropped by 20-25%, then gradually returned to pretreatment level over a 120-hr period. Similar viscosity reductions of 18-22% have been noted with polymers exposed to an acoustic field. This phenomenon of oil viscosity reduction is suggested to be linked with the heat generated by absorption of ultrasound component of the acoustic waves.

Surface tension. Under some theories, it is suggested that the fundamental source of the increased permeability is the reduction in surface tension caused by the differential velocity between the rock matrix and the pore fluid.

Increased permeability. It has been speculated that seismic waves can disrupt immobile fluid boundary layers on pore walls, which would increase the effective cross section of pores. The pore throats are unplugged and the rock's permeability increases.

As shown in FIG. 1 there are different approaches to EOR. The most common methods are described below:

Thermal EOR methods are generally applicable to heavy/viscous crude oils, and involve the introduction of thermal energy or heat into the reservoir to raise the temperature of the oil and reduce its viscosity. Steam (or hot water) injection and in-situ combustion are the most popular thermal recovery methods. Three common methods involving steam injection are cyclic steam stimulation ("huff and puff"), steam flooding and steam assisted gravity drainage. In-situ combustion involves the injection of air, where the oil is ignited, generates heat internally and also produces combustion gases, which enhance recovery. Air injection works in heavy and deep light crude oil reservoirs and is considered an alternative for offshore and onshore mature fields with no access to $CO_2$ sources. An additional benefit of air injection is the generation of flue gases (combustion gases) for pressure maintenance that also can be re-injected in the same or adjacent reservoirs.

Gas injection EOR methods, represent other popular EOR methods, and are applicable to light oil reservoirs, in both carbonates and sandstones. Their popularity is given by the increased oil recovery through miscibility and disposal of a greenhouse gas ($CO_2$ sequestration). The current challenges in gas injection as an EOR method are gravity segregation, and most importantly, availability of a low-cost gas source. Especially the $CO_2$ flooding has been used effectively in mature and in water-flooded carbonate reservoirs. Besides $CO_2$, miscible and immiscible hydrocarbon gas is also an excellent solvent for light oil reservoirs and sandstone reservoirs. Other gases, such as nitrogen and acid or sour gases are injected for EOR, although to a lesser extent than $CO_2$ and hydrocarbon gases. Nitrogen flooding has been an effective recovery process for deep, high-pressure, carbonate light crude oil reservoirs.

Chemical EOR methods or chemical flooding, have the primary goal to recover more oil by either one or a combination of the following processes: (1) Mobility control by adding polymers to reduce the mobility of the injected water, and (2) Interfacial tension reduction by using surfactants, and/or alkalis. Surfactant injection remains challenging, especially in a high salinity, high temperature environment. Alkalis, although cheap, bring along a string of operational headaches (scaling, emulsions, plugging, etc.). Nearly all of the polymer floods have been implemented in sandstones, and carbonates remain a major challenge. Most of the polymer floods use water soluble polyacrylamides and biopolymers (polysaccharides and cellulose polymers) to a lesser degree. Micellar polymer (petroleum sulfonates and synthetic alkyl sulfonates) flooding, also known as surfactant-polymer flooding has been the second most used EOR chemical method in light and medium crude oil reservoirs. Alkaline Surfactant Polymer formulations use moderate pH chemicals such as sodium bicarbonate ($NaHCO_3$) or sodium carbonate ($Na_2CO_3$) rather than sodium hydroxide (NaOH) or sodium silicates. Main functions of alkaline additives are to promote crude oil emulsification and increase ionic strength decreasing interfacial tension and regulating phase behavior. The alkaline additives also help to reduce the adsorption of anionic chemical additives by increasing the negative charge density of mineral rocks and at the same time making the rock more water-wet.

All the above EOR methods have their limitations and the new approaches as microbial EOR (see FIG. 1) are also very specific and expensive, based on the microbial load of a certain oil field in order to produce digesting of long hydrocarbon molecules, or by generating bio-surfactants, or by emitting carbon dioxide (which then functions as described in gas injection EOR). The acoustic and electromagnetic EOR methods seem to be less dependent on field oil specificity, which makes them very promising for the future. The differentiation between electromagnetic and acoustic methods comes from their efficiency/productivity and financially viability in stimulating oil recovery. The acoustic methods have the edge due to the high pressure fields and energy that can be generated in the wells, which can easily change the structure of the oil field/reservoir 60 and can modify the viscosity/flow of the oil towards the well bore 22 (FIG. 6).

Although the penetration of the acoustic waves can be less when compared with the electromagnetic waves, a progressive approach of treating near fields and then far/deeper fields (based on the positive results from the near fields) with increased energies and non-focused shock waves can allow deep penetrations inside the well. High energy shock waves generators, with low maintenance, that focus the energy unidirectional for sufficient periods of time can easily accomplish deep penetrations into the well and thus oil stimulation. In order to achieve the desired results, for the vertical well bores 22 the shock waves stimulation must be done perpendicular to the longitudinal axis of the well bore 22. In the case of the very deep horizontal well bores 22 the shock waves stimulation can be also done perpendicular to the longitudinal axis of the well bore 22. However, to avoid the propagation of shock waves into the aquifer from above the oil reservoir 60 or outside the oil reservoir 60, the shock waves can be directed at angles between 30 to 90 degrees from the longitudinal axis of the well bore 22 (see FIG. 26 for such embodiment), which will limit their travel distance just inside the oil reservoir or significantly below the aquifer. Controlled shock waves penetrations can be also achieved through the special design of the shock wave devices 45, which can keep shock wave stimulation just inside the oil reservoir 60.

Previous inventions that describe the usage of electrohydraulic shock waves in IOR/EOR (U.S. Pat. Nos. 4,169,503, 4,345,650, and 6,427,774) have used high electrical voltage discharge into a liquid to induce a plasma bubble that ultimately results in a shock wave. The hydraulic shock wave method does require a liquid medium to produce and effectively transmit the shock wave.

It is the purpose of the present inventions to provide different methods of generating focused or non-focused/unfocused shock waves using specific devices that contain either of the following energy sources as the shock waves generators:

contains one or multiple laser sources
contains a self-generated combustible gas supply
dispenses a micro-explosive element
utilizes piezo fibers/piezo crystals It is a further objective of the present inventions to provide novel shock wave generating devices that can, if required, be applied in conjunction with other oil recovery methods such as those presented above—water and gas injection methods, thermal methods and chemical methods. The propagation of shock waves is very different in fluids or gases (due to different acoustic impedance and sound speed), which will have an influence on shock waves action when used in conjunction with other IOR/EOR fluid methods or gas methods.

It is a further objective of the present inventions to provide a means of controlling the energy, hence the penetrating depth of the shock wave by the amount of energy generated from the energy sources described and the repetition frequency of the shock wave.

It is a further objective of the present inventions to provide a variety of focused hydraulic shock wave sources from a common device; determined by the number of ellipsoid reflectors housed in the device, their specific shape and their radial direction.

It is a further objective of the present inventions to provide a main control system above ground to communicate with the device for uploading images and status, controlling functional states and well position of the device, and activating each hydraulic generator of the device.

It is a further objective of the present inventions to provide a means of remotely viewing and detecting the perforations in the production casing of the oil well so that the perforations can be aligned with the focused hydraulic generating feature of the device.

It is a further objective of the present inventions to provide a hydraulic shock wave that does not damage the existing structure of the oil well where it is applied to.

By the present inventions, several methods and devices are proposed that utilize shock wave generation for IOR/EOR. The shock wave devices proposed will require an above ground electrical power source such as a power generator, a pressurized water supply providing filtered degassed water, and a remote control cable feed to the device from a main control console, which is part of the invention. According to FIG. 6, the shock wave device 45 is lowered into the production casing or production liner 43 of the well bore 22. Then the focal source(s) of the device are aligned, by remote control, with the selected opening/well wall perforation 44 in the production casing 43 (see FIG. 4). The invention will support the shock wave device 45 rotating radially 360 degrees independent of the structures that are connected to it. If this is not required the elements of the shock wave device 45 can be simplified to remove this capability.

Figure 26:
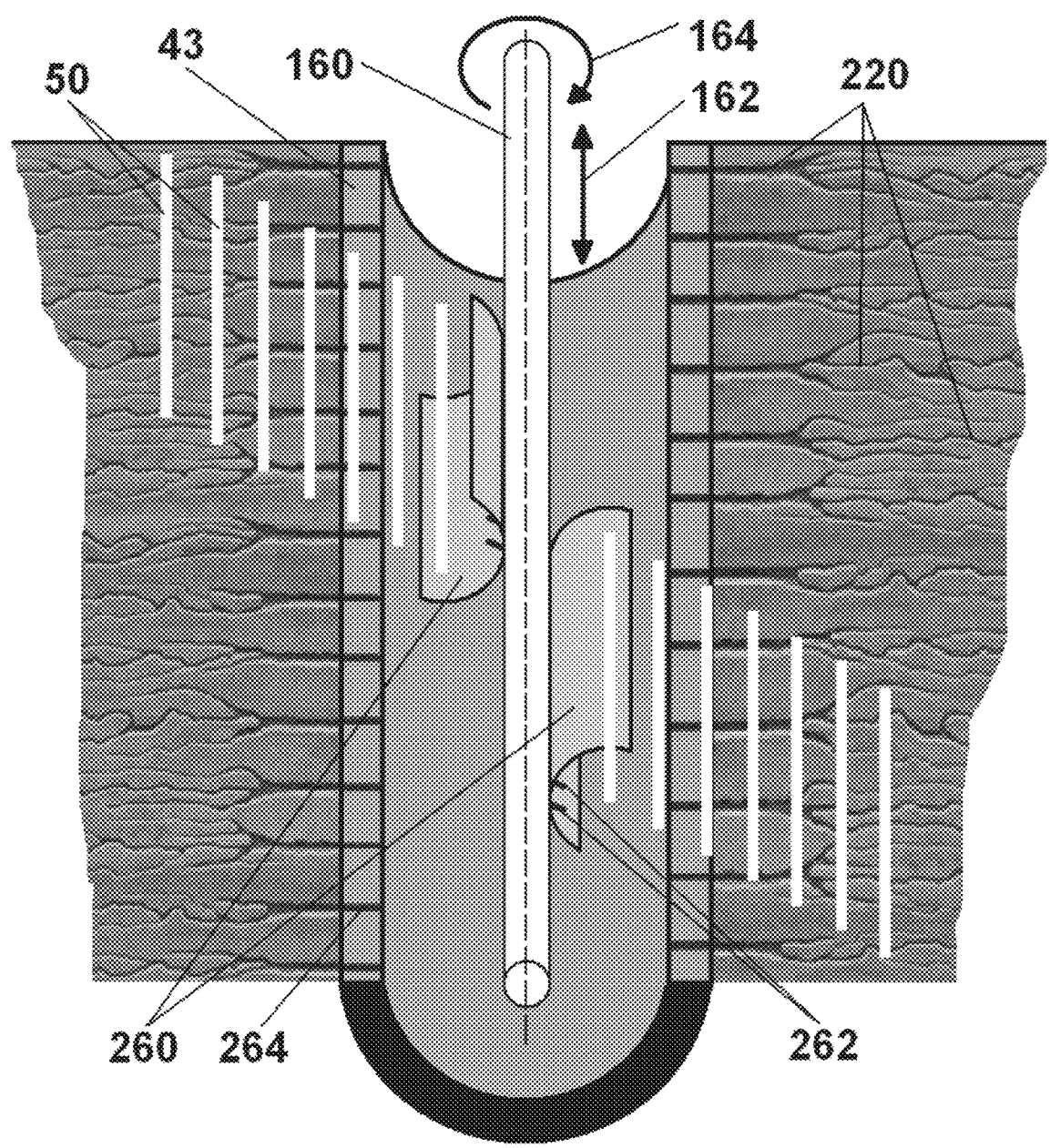
FIG. 26 is a diagram illustrating a battery of half-pipe shock waves applicators positioned in a common device that provides focused shock waves for activating the oil reservoir.
Figure 27:
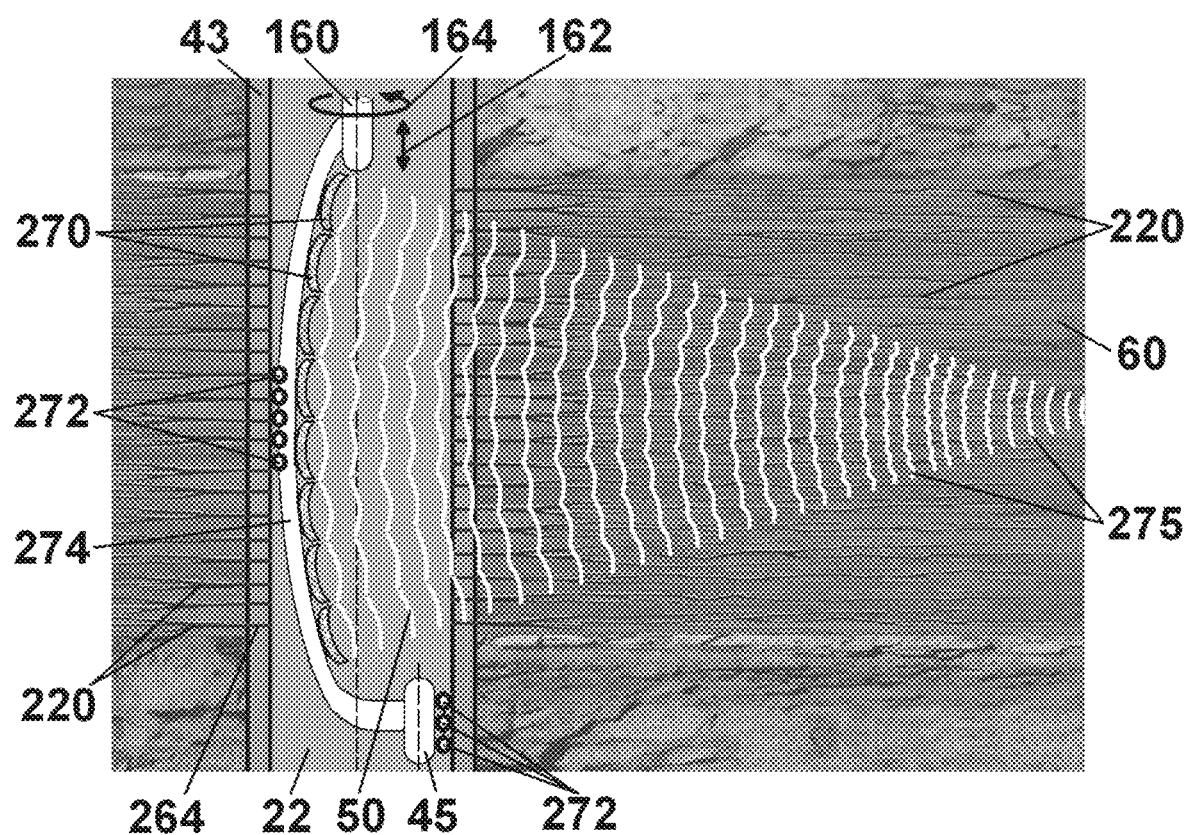
FIG. 27 is a diagram illustrating a battery of shock waves applicators positioned on a portion of an ellipse or sphere shape beam in a common device that provides pseudo-planar or planar shock waves for activating the far field of the oil reservoir.

The shock wave device 45 can utilize optical sensing and/or metal proximity sensing to sense the openings in the well bore casing/liner 264 (shown in detail in FIG. 26 or FIG. 27). Detection of the perforation(s) in the production liner 264 are determined automatically by the shock wave device 45 and are communicated to the main control system located above ground/surface 62. Controlling and adjusting the depth inside the well bore 22 of the shock wave device 45 is not within the scope of this invention, however this exists within the capability of present oil extracting equipment/oil extraction rigs 64.

The shock wave device 45 contains all the elements to transform the supplied electrical power into generating the shock waves and rotating the shock wave device 45 within the casing/production liner 43. The general shock wave device 45 elements are according to FIG. 7, FIG. 8, FIG. 9, FIG. 12 and FIG. 13, the power converter system 70A, motor control and drive subsystem 70B, the micro control system 70D, subsystem power generation and distribution 70E, various motors and gear heads and lastly the focused/unfocused generator 68 for creating the shock waves, which one or more generators may be integrated into the shock wave device 45 limited only by the diameter of the casing/production liner 43. Each focused/unfocused generator 68 is independently energized by the main control system located above ground/surface 62. The shock wave device 45 can be attached to a segmented drilling/oil extraction rig 64, or other oil rigging segments that move within the casing/production metal liner 43 of the well/production bore 22. The amount of energy and focal depth generated by the specific shock wave device 45 is determined by how shock wave device 45 is configured and the other supporting elements unique to the method, which will be discussed in detail for the inventions to follow.

FIG. 6 (not to scale) is a general illustration of how each shock wave device 45 describe in this patent, is aligned to the particular oil reservoir 60 that exists below the surface 62, and how the shock wave device 45 will interface above the surface 62. The oil extraction rig 64 and means of attaching the shock wave device 45 to the oil extraction rig 64 is not covered by this invention but is well within the current art of oil production equipment. It is possible that the shock wave device 45 can be fitted with a mechanical drive system (not shown) so that it can move vertically or horizontally within the well casing 43 without needing a separate structure. Wheels or rollers can be part of the shock wave device 45 so that it can maneuver through the well casing 43 by remote control using the main control cable conduit 65 or be lowered by cable from an above ground/surface 62 support means (not shown). Each shock wave device 45 will require a source of electrical power from the electrical power feed conduit 66 that is connected above the well to an electrical (power) substation, or AC or DC generator. Some of the shock wave device 45 that will be described will require replenishment of a liquid that may be in the form of treated water or a special liquid mixture that is supplied through a liquid carrying conduit 67.

One or more focused shock wave generators 68 in the shock wave device 45 are aligned by remote control to the various opening/well wall perforations 44 in the production casing 43. A main control console (not shown), located above ground (at the surface 62) remotely controls the shock wave device 45 through the main control cable conduit 65. The main control console, through remote communication with the shock wave device 45, commands the device to rotate the focused shock wave generators 68 until an opening/well wall perforation 44 in the production casing 43 (see FIG. 4) can be found and/or visualized. Finding the opening(s)/well wall perforation(s) 44 can be performed by the shock wave device 45 using proximity sensing methods or controlled remotely by an operator using the proximity sensors and/or optical feedback. After locating the opening(s)/well wall perforation(s) 44 the operator can command the shock wave device 45 to generate focused shock waves 50 from one or more independently activated focused shock wave generators 68.

The shock wave device 45 in FIG. 6 illustrates two (2) opposing facing focused shock wave generators 68 or at different angles to one another, and can also be vertically displaced from one another. The focused shock waves 50 are transmitted, through the aggregate of fluids and solid substances radially (focused shock waves direction 52), from the shock wave device 45. In FIG. 6 the power to the shock wave device 45 is fed from above ground/surface 62 using an electrical power feed conduit/cable 66, which is connected at the other end by an electrical AC power source, e.g. being either a power substation or power generator. A control cable conduit 65 is required to provide remote communication and image transfer from the shock wave device 45 to the main control console (not shown). To protect the cables from abrasion each cable is fed into a flexible water tight conduit that exists from the surface 62 into the well bore 22 to the connection of the shock wave device 45 and its focused shock wave generator 68. A liquid supply/carrying conduit 67 is required for some of the shock wave device 45 being proposed. The shock wave device 45 can be located at various positions along the rigging segment to facilitate IOR/EOR using focused shock waves 50 that are transmitted along the focused shock wave direction 52 into the oil reservoir 60.

Figure 7:
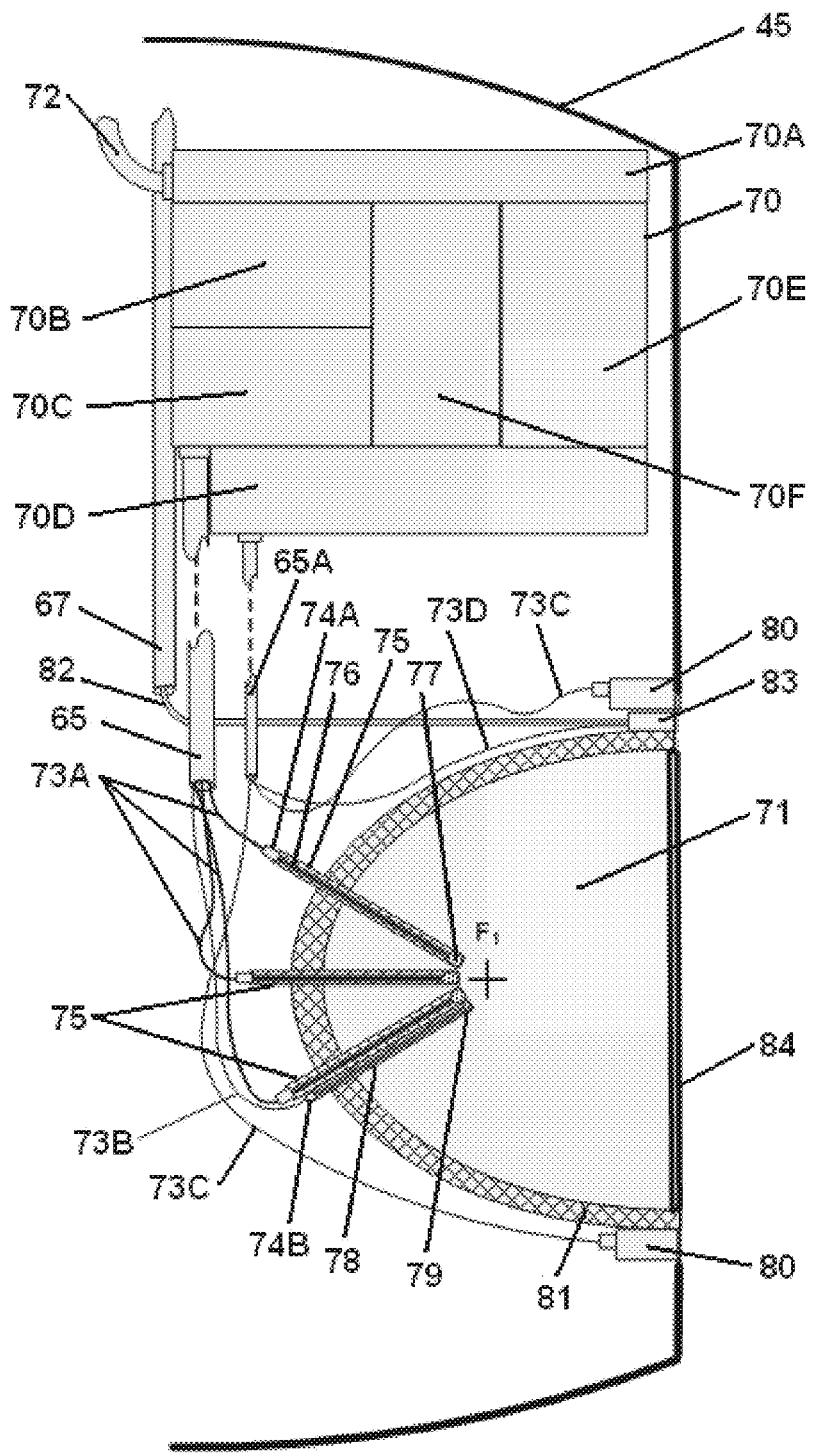
FIG. 7 is a diagram illustrating a device that generates a hydraulic shock wave utilizing separate optical fibers to couple laser energy into superheating the fluid in the focal region ($F_1$) of the ellipsoid reflector. A pressure coupling membrane separates the fluid contained inside the reflector from the well bore liquid/oil mixture.

The embodiment of FIG. 7 utilizes three (3) laser energy sources, controlled by the subsystem unit 70 of the shock wave device 45, to form a plasma bubble in liquid 71 that will ultimately result in a shock wave. In FIG. 7 the subsystem unit 70 receives its power through the power conduit 72, which will tie in directly or indirectly to the electrical power feed conduit 66 (see FIG. 6). The power converter 70A generates the required supply voltages for the subsystem unit 70 to operate. The subsystem unit 70 has a micro-control system 70D that is in communication with the main control system located above ground. The shock wave devices 45 contains a laser power generator 70E, one or more laser sources 70F, a fiber interface/spectral analyzer 70C, motor control and drive system 70B, the power converter 70A, and the various electrical and electromechanical controls and sensors that will be described in detail in this patent.

Three (3) fiber optic cables 73A are fed from the subsystem unit 70 through the control cable conduit 65 to provide mechanical protection. Each fiber optic cable is attached to a fiber cable optic connector/coupler 74A to couple the laser energy to an optical collimator or the optical feed-through assembly 75. The optical feed-through assembly 75 is used to convey the laser energy into the liquid 71 environment, while protecting the internal elements of the assembly that consist of an internal fiber optic cable 76 and an optical lens or a beam collimator 77. The optical feed-through assembly 75 or optical collimator 77 focuses the laser energy at the focal area $F_1$ of the shock wave generating region. The purpose of multiple directed laser energy sources is to quickly induce and control the size of the thermal plasma bubble formation in the liquid 71 so that the magnitude of the resulting shock wave can be controlled. The proposed embodiment does not preclude having less than or more than three (3) optical feed-through assemblies 75.

The type of the laser power generator in FIG. 7 is specific to the particular laser that is utilized in subsystem unit 70, and having laser generation in proximity to the final output at the beam collimator 77 reduces energy loss. The type of laser system in subsystem unit 70 can be a continuous wave or a pulsed laser, with the later producing more spatial peak power density. Given the typically small diameters of an oil well's production casing, the laser(s) in subsystem unit 70 would most likely be solid state devices such as laser diodes, laser diode arrays, diode laser bars, diode stacks, lamp pumped or diode pumped solid state lasers, or fiber lasers. The solid state laser systems mentioned are more compact and less sensitive to environmental influences at the cost of poorer beam quality ($M^2$ beam quality factor of ~2 to 5), which the latter is not as significant an issue for the application.

The shock waves for IOR/EOR would need to have a repetition rate in the low to moderate range of 1 to 20 Hz. Laser pulse widths in the microseconds are required for the thermal plasma reaction in liquid 71 to occur, a continuous wave laser would need to be modulated by the micro-control system 70D in subsystem unit 70 to produce the desired repetition rate, as well as have fast turn on and turn off characteristics. A pulsed laser system would produce a series of high frequency pulses (e.g. picoseconds to nanoseconds wide) with a modulated duration in the microseconds and at the desired repetition rate by the micro-control system 70D) in subsystem unit 70.

For best conversion efficiency i.e. complete spectral absorption, the optical wavelength produced by the laser should match the wavelength of the liquid 71 molecule's fundamental resonant frequency, or be a harmonic of it. Optimization of conversion efficiency means that the majority of the spectral absorption of the liquid 71 is transformed into heat, resulting in quickly producing plasma. Optimizing conversion efficiency can include adjusting the liquid 71 to be a mixture of specific solid particles diluted into a solution, or be a mixture of different solutions so that it contains molecules that closely match the optical wavelength of the laser(s) used in subsystem unit 70. This prior discussion does not preclude using water, as the liquid 71, while utilizing a laser whose optical wavelength is in the range of 970 nm, a principal resonant frequency of a water molecule, or being in the range of a close harmonic.

FIG. 7 includes a means of monitoring the system performance by measuring the reaction temperature of the plasma bubble collapse using a method of optical fiber thermometry. An optical fiber tube assembly 78 extends into the $F_1$ region of the liquid 71. The optical fiber tube assembly 78 contains an optical lens or optical filter 79 and an optical fiber tube connector/coupler 74B to transmit specific spectral frequencies created from the sonoluminescence of the plasma reaction in the liquid 71 to the fiber interface/spectral analyzer 70C of the subsystem unit 70 via the optical fiber tube cable 73B.

There are two (2) proximity sensors and/or digital optics 80 located at the perimeter of the ellipsoid reflector 81 of the shock wave device 45. The proximity sensors and/or digital optics 80 can detect the presence of metal so that alignment of the ellipsoid reflector 81 to an opening in the metal production liner/casing 43 (corresponding to the well wall perforations 44—see FIG. 4) can be accomplished. The proximity sensors and/or digital optics cable 73C and protective control cable conduit 65A links the proximity sensors and/or digital optics 80 output with the micro-control system 70D so that alignment could be accomplished locally by the micro-control system 70D or remotely with the main control system (not shown) via the control cable conduit 65. The movement of the device to align the ellipsoid reflector 81 with the openings in the production liner/casing 264 (shown in detail in FIG. 26 or FIG. 27) occurs by a system of gears and mechanical linkages with motors and the electrical motor control and drive system 70B incorporated in subsystem unit 70. The electromechanical drive rotates the shock wave device 45 within the well bore 22 (see FIG. 6). In other potential embodiments the shock wave device 45 incorporates an electromechanical drive that can move the device vertically or horizontally for a vertical or horizontal well bore 22, respectively. The motor control and drive system 70B from subsystem unit 70 is directly controlled by the micro-control system 70D, which itself is remotely tasked by the main control console located above ground/surface 62 (as discussed for FIG. 6) to perform the required movement of the shock wave device 45. There are positioning sensors (not shown) in the motor control and drive system 70B of the subsystem unit 70 to sense vertical, horizontal and radial displacement that is reported to the micro-control system 70D.

The frequent repetition of the shock wave generating process will require that the liquid 71 be replenished in the cavity of the reflector 81. The liquid is supplied from above the well through the liquid causing conduit 67 into the liquid tubing 82 that connects to a fluid fill and vent assembly 83. The fluid-fill and vent assembly 83 enables supplying the liquid 71 cavity with new liquid. Periodically, the control status from the micro-control system 70D transmitted through the fluid fill and vent assembly cable 73D and protective control cable conduit 65A, signals the fluid-fill and vent assembly 83 to open. The fluid fill and vent assembly 83 would incorporate an air vent or air purge element to remove trapped air in the cavity of the reflector 81 during the filling process.

Figure 9:
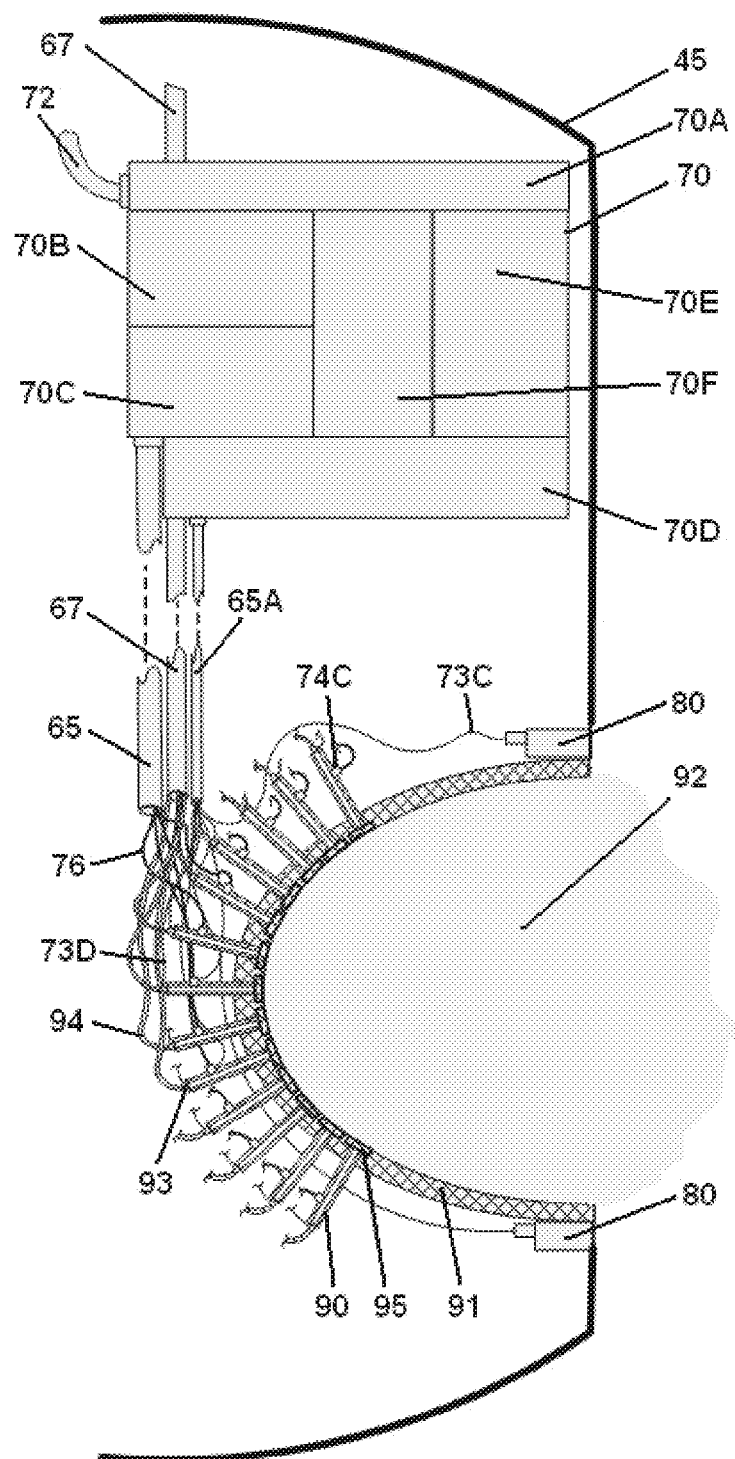
FIG. 9 is a diagram illustrating a device that generates a hydraulic shock wave utilizing a plurality of shock tubes spaced around the reflector to separately generate micro jet pulses into the well bore fluid contained by the perforated reflector.

Lastly a pressure coupling membrane 84 is utilized in the device to separate the environment from the liquid 71. The pressure inside the liquid 71 (enclosed in between the membrane 84 and the ellipsoid reflector 81) should be equal with atmospheric pressure to allow proper plasma bubble formation/oscillation that constitutes the origin of the shock waves and transmission of the generated shock waves into the environment (i.e. the oil 40 (FIG. 4) or oil mixture 92 as seen in FIG. 9)). The membrane 84 would be robust and sufficiently attached to the ellipsoid reflector 81, to reliably seal and endure the anticipated high dynamic pressure cycling to which the interface would be subjected. Also, the membrane 84 should be able to resist any high pressure that exists outside of the shock wave device 45 into the oil 40 or oil mixture 92.

Figure 8:
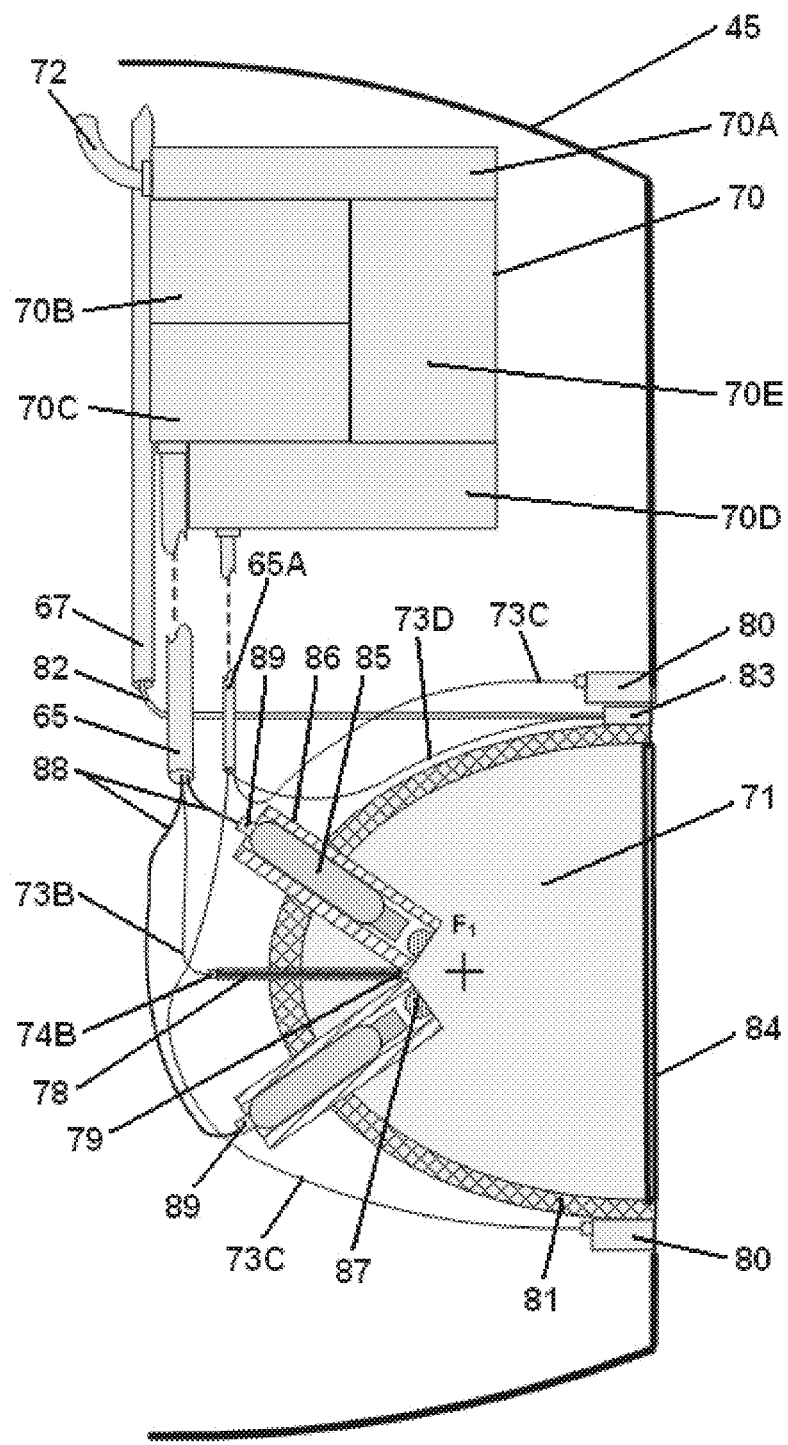
FIG. 8 is a diagram illustrating a device that generates a hydraulic shock wave utilizing separate lasers to superheat the fluid in the focal region ($F_1$) of the ellipsoid reflector. A pressure coupling membrane separates the fluid contained inside the reflector from the well bore liquid/oil mixture.

The embodiment of FIG. 8 shows the shock wave device 45 that also uses laser energy to create a shock wave. Two (2) incased lasers 85 are each incased by a protective housing 86 and an optical lens or a beam collimator 87 enabling insertion into the liquid medium 71. Insertion of the lasers in close proximity to the focus $F_1$ is more energy efficient when compared to FIG. 7. However FIG. 8 construction would more likely require a larger volume for ellipsoid reflector 81 that is constrained by the available working volume of the production casing 43. The lasers 85 are powered from the laser power generator 70E via laser fiber interface 70C from subsystem unit 70 that connects to each laser by the power cable 88 and power connection 89. The other functions of FIG. 8 including the types of lasers that might be utilized in this embodiment would be identical to FIG. 7, so no other description is needed.

The embodiment of FIG. 9 shows the shock wave device 45 that creates multiple hydraulic shock waves from multiple shock tubes 90 that surround the truncated ellipsoid reflector 91. The shock waves combine within the reflector volume and are directed outward from the reflector into the oil/liquid medium 92 of the production well 22 (see FIG. 6). Each shock tube will be filled with a small volume of liquid, similar to the type of liquid 71 described in FIG. 7, and laser energy provided by the subsystem unit 70 is directed into the liquid 71 of each shock tube 90. The shock tube 90 offers the benefit of heating a small volume of liquid 71 to induce the plasma bubble formation. The shock tube 90 is first filled with the liquid 71 using its fluid fill and vent valve 93 and the liquid supply tubing 94 carried and protected by the conduit 67. The conduit 67 and liquid supply tubing 94 would ultimately connect to the main supply above the production well. Filling each shock tube would be controlled by the micro-control system 70D in the subsystem unit 70 that could detect an adequate fill by the removal of air from the particular fill and vent valve 93. After filling the shock tube 90 the micro-control system 70D shuts off the fill and vent valve 93. The micro-control system 70D is now ready to initiate the shock wave by supplying laser energy into all or specific optical fibers 76 using the laser source(s) 70F and fiber interface 70C of the subsystem unit 70. The optical fiber 76 is connected to the shock tube using a shock tube optical connector/coupler 74C that may include an optical lens 79 or a beam collimator 77 as shown in FIG. 7.

The plasma bubble is formed quickly by the confinement of the liquid in the small diameter of the shock tube 90 and once the plasma bubble collapses the shock wave that is created can only exit through the shock tube pressure coupling membrane 95 of each shock tube 90 into the oil and liquid mixture 92 of the production well 22 (see FIG. 6).

The embodiment of FIG. 9 depicts a truncated ellipsoid reflector 91 with large number of openings (see FIG. 11) that would have each opening connected with a shock tube 90. The illustration is an example and there can be less or more openings in the truncated ellipsoid reflector 91 fitted with shock tubes 90. The method of FIG. 9 is to generate a number of simultaneous shock waves in the cavity of truncated ellipsoid reflector 91 that would interfere and converge, therefore creating larger amplitude acoustic waves that propagate into the oil and liquid mixture 92 of the well 22 (see FIG. 6). Depending on the volume and content of the liquid 71 in the shock tube, the laser energy would require short duration pulses in the range of picoseconds to nanoseconds. The other functions of FIG. 9 would be identical to FIG. 7, so no other description is needed.

Figure 10:
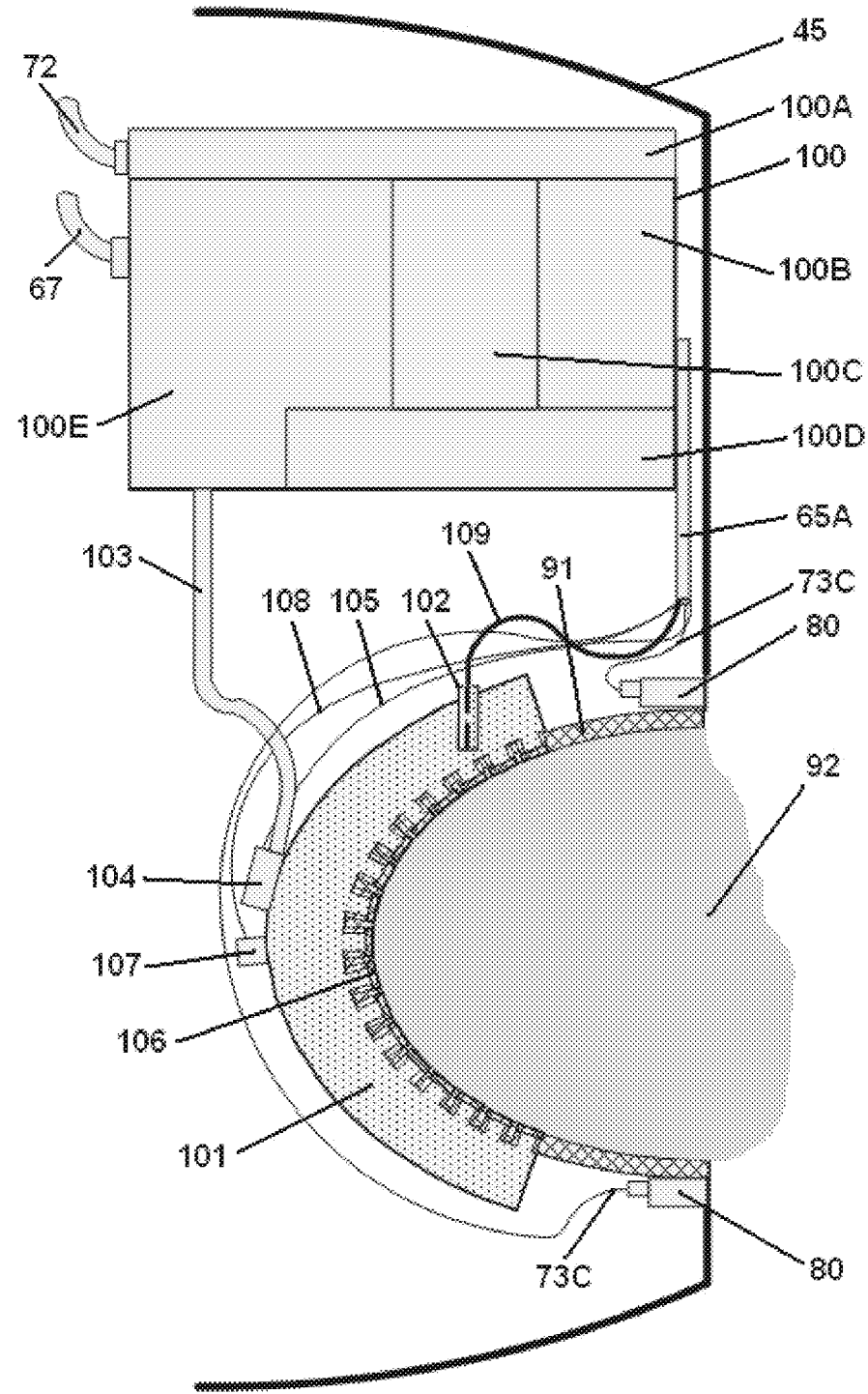
FIG. 10 is a diagram illustrating a device that generates a hydraulic shock wave by combustion of pressurized Hydrogen gas or Hydrogen-Oxygen gas mixture, which generates micro jet pulses into the well bore fluid contained by the perforated reflector.

The embodiment of FIG. 10 shows the shock wave device 45 that utilizes a portably generated hydrogen gas or hydrogen-oxygen gas mixture that is compressed by control subsystem 100 in a combustion chamber 101, and will combust once the electrical discharge in discharger 102 occurs. The violent combustion in combustion chamber 101 generates a shock wave in the gas that is coupled into the oil/liquid mixture 92 of the production well 22 (se FIG. 6). The hydrogen gas generated by the portable $H_2$ gas generator 100E is conveyed by the gas conduit 103 to the $H_2$ fill valve 104. The $H_2$ fill valve 104 is opened through control cable 105 in communication with the micro-control system 100D of control subsystem 100, which allows the hydrogen to enter the combustion chamber 101. The hydrogen ($H_2$) gas entering the combustion chamber 101 is able to pressurize because of the individual pressure coupling membranes 106, which exist in the truncated ellipsoid reflector 91 structure, to isolate the gas from the oil/liquid mixture 92 of the production well 22 (see FIG. 6). The hydrogen gas fills the combustion chamber 101 until a certain pressure is reached as sensed by the pressure sensor 107 and communicated to the micro-control system 100D through the interface cable 108 and protective control cable conduit 65A. A high voltage pulse generator 100D in control subsystem 100 supplies the sufficient voltage through the power carrying cable 109 to create an arc in the electrode gap (not shown) of discharger 102. The arc that is produced in the pressurized gas compartment of combustion chamber 101 results in combustion of the gas.

The portable $H_2$ gas generator 100E utilizes a method of electrolysis to derive the hydrogen. The science behind the electrolysis is not described for this invention, however the referral of several methods of electrolysis is proposed that could be potentially viable but does not preclude using other methods as the technology evolves. Viable commercial electrolysis methods at this time are the two electrode electrolyzers, or proton exchange membrane (PEM) electrolyzers, and lastly plasma electrolysis of water using a laser.

The liquid carrying conduit 67 supplies the electrolyte and/or water (the reactant—depending on the type of electrolyze) to the portable $H_2$ gas generator 100E for maintaining the reaction.

The embodiment of FIG. 10 produces multiple shock waves simultaneously. The truncated ellipsoid reflector 91 contains multiple apertures 110 (see FIG. 11) each sealed by individual pressure coupling membrane 106 for the combustion pressure to hydraulically couple into the oil/liquid mixture 92 volume contained by the truncated ellipsoid reflector 91. The multiple shock waves combine through interference and convergence to produce larger amplitude hydraulic shock waves. The remaining items of FIG. 10 are in common with FIG. 7 and would function identically, so no other description is needed.

Figure 12:
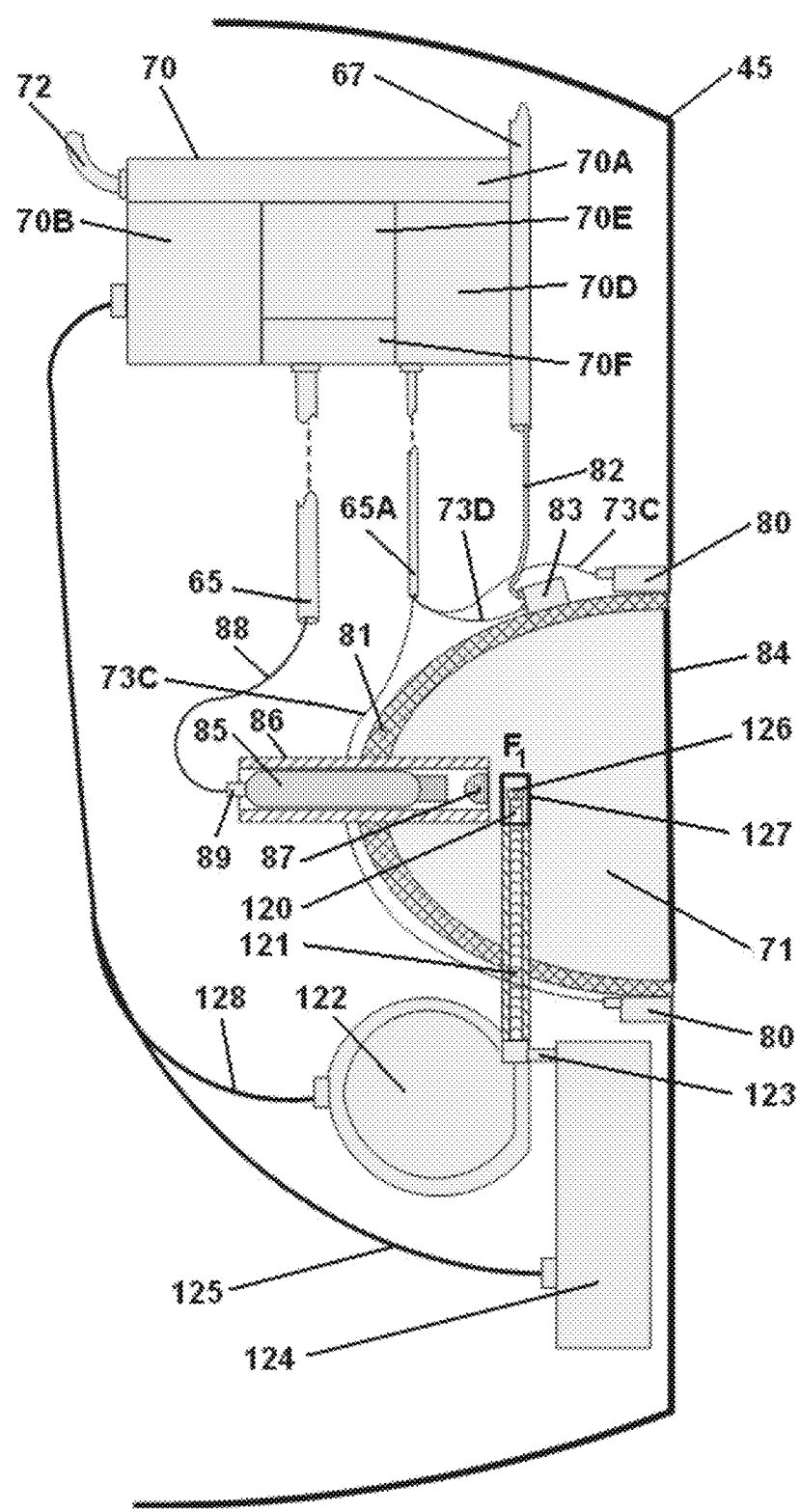
FIG. 12 is a diagram illustrating a device that generates a hydraulic shock wave by laser detonation of a micro-size explosive pellet. A pressure coupling membrane separates the fluid contained inside the reflector from the well bore liquid/oil mixture.

The embodiment of FIG. 12 shows the shock wave device 45 that creates a shock wave by laser detonation of a secondary explosive pellet 126 containing Pentaerythritol Tetranitrate (PETN). The PETN pellet 126 can include a substrate of which the PETN is supported and enhances the laser reaction that results in detonation. The rational for using PETN as the explosive material is that it is the least reactive and the most thermally stable of the nitrate based explosives. The process of producing the PETN pellet 126 is not within the scope of this invention, but there are various research papers to support the utilization of PETN and the particular method of laser detonation in this invention.

The shock wave device 45 in FIG. 12 starts with the micro-control system 70D of subsystem unit 70 lowering the pedestal 120 by retracting a flexible linkage 121 into the rotating drum 122. The pedestal 120, which is designed to support the pellet 126 for detonation, is lowered until it is aligned with pellet feeder's output 123. Once alignment occurs the pellet storage vessel 124 retrieves a PETN pellet 126, which is stored internally, and places it on the pedestal 120. The pellet storage vessel 124 is designed to protect the stored PETN pellets from accidental detonation due to the surrounding shock waves that will be generated. The pellet storage vessel control cable 125 provides the status of the remaining explosive pellets in pellet storage vessel 124, and the retrieved pellet's location status in the pellet storage vessel 124 and pellet feeder's output 123, to the micro-control system 70D of subsystem unit 70. The same pellet storage vessel control cable 125 connects the internal motor of pellet storage vessel 124 to the motor control and drive system 70B of subsystem unit 70. After the pellet 126 is placed on the pedestal 120, the pellet 126 is raised by the flexible linkage 121 into the firing chamber 127 by rotating the drum 122 in the opposite direction. The control cable 128 connects the internal motor of the rotating drum 122 to the motor control and drive system 70B of subsystem unit 70 as well as communicates the state position of the pedestal 120 to the micro-control system 70D of subsystem unit 70. The micro-control system 70D through communication with the motor control and drive system 70B, and the electromechanical controls of the rotating drum 122 and pellet storage vessel 124, manages all of the pellet 126 feeding and positioning operations.

The firing chamber 127 is open to the liquid medium 71 so that the (laser initiated) thermal reaction of the explosive pellet 126 and its detonation occurs directly in the liquid medium 71. The firing chamber is raised to align the pellet 126 with the ellipsoid reflector 81 focus $F_1$ that also aligns with the encased laser 85 and its optical lens or beam collimator 87. A protective housing 86 encloses the encased laser 85 and optical lens or a beam collimator 87 enabling insertion into the liquid medium 71. The liquid medium is contained by the ellipsoid reflector and the pressure coupling membrane 84. The pressure coupling membrane 84 must be robust and sufficiently attached to the ellipsoid reflector 81 to couple the focused shock wave to the environment of the production well 22 (see FIG. 6) and fulfills the same roles, as mentioned before for FIG. 7.

There are several means to controlling the magnitude of the shock wave with this invention, such as the PETN pellet size, density, and construction of other incorporated materials in the pellet 126. Other means are the type of laser and optical wavelength, and the laser pulsing or modulation method. The remaining items of FIG. 12 are in common with FIG. 7 and would function identically, so no other description is needed.

Figure 13:
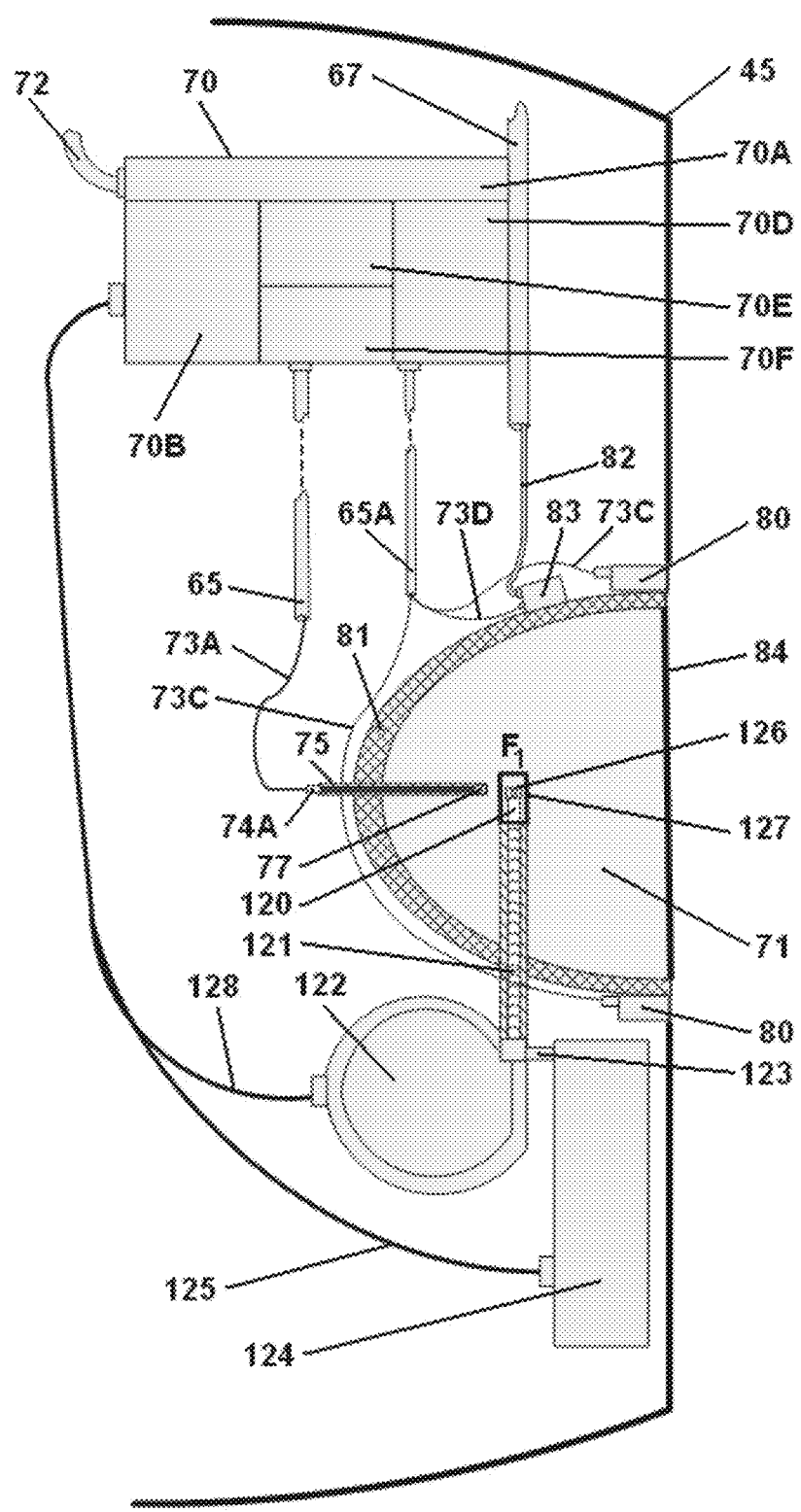
FIG. 13 is a diagram illustrating a device similar to FIG. 12 with the exception that the explosive pellet is detonated from the output of an optical fiber that supplies the laser energy. A pressure coupling membrane separates the fluid contained inside the reflector from the well bore liquid/oil mixture.

The embodiment and functions of FIG. 13 are identical to FIG. 12, with the exception that an optical feed through assembly or optical collimator 75 is energized by a laser source 70F in subsystem unit 70 to detonate the explosive pellet 126. The remaining items of FIG. 13 are in common with FIG. 7 and FIG. 12 and would function identically, so no other description is needed.

Figure 14:
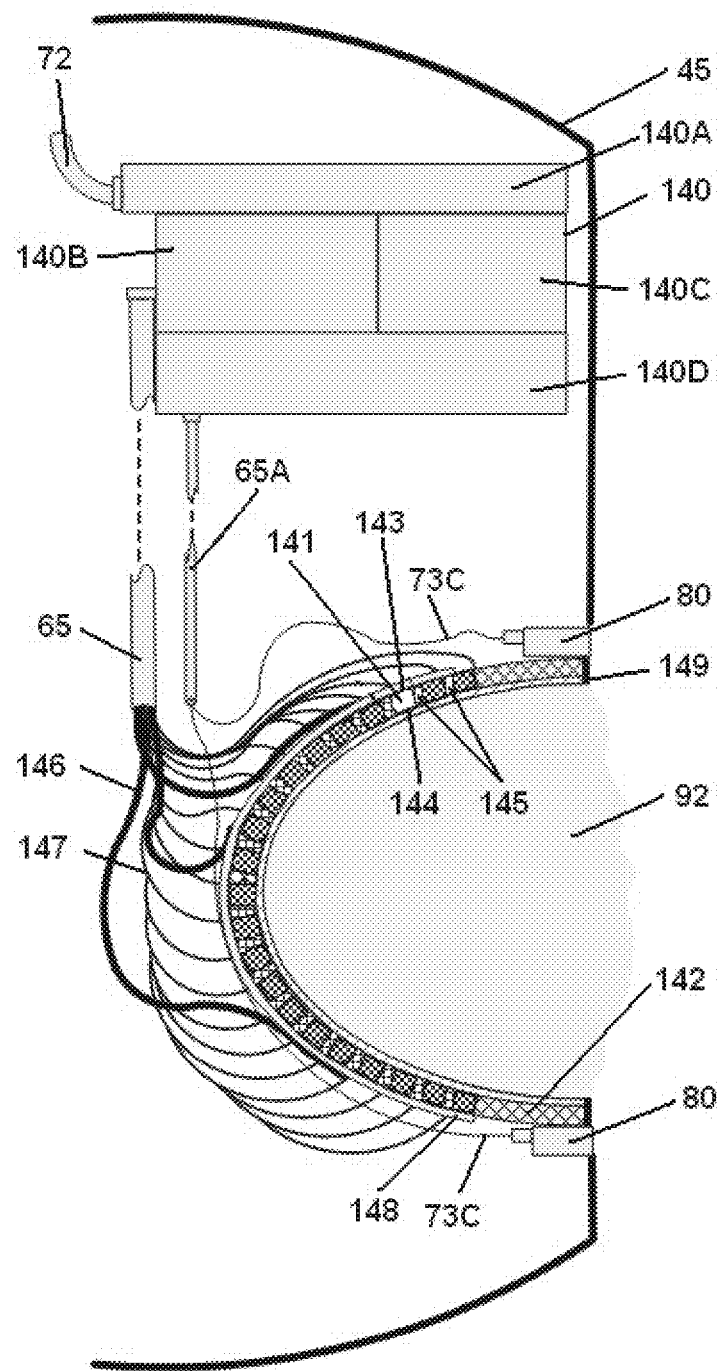
FIG. 14 is a diagram illustrating a device using piezo-fibers integrated into a reflector used to generate and focus the shock waves.

The embodiment of FIG. 14 shows the shock wave device 45 that creates a shock wave by energizing groups of piezoelectric fiber composites/groups 141 that are distributed throughout and supported by an ellipsoid structure 142.

Figure 15:
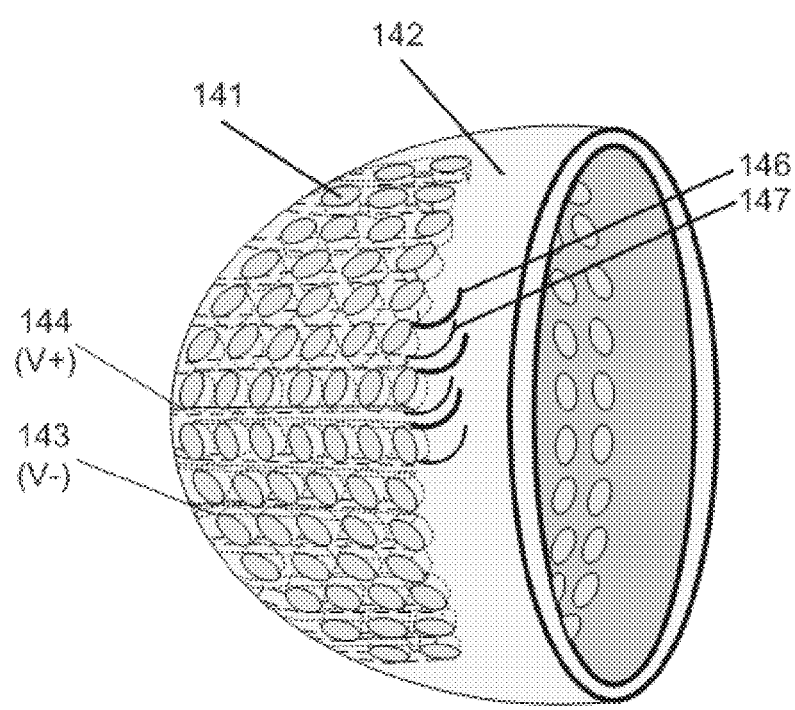
FIG. 15 is a diagram illustrating an interconnection method of energizing the piezofiber elements in FIG. 14.

Individual shock waves are generated by each piezoelectric fiber composites/groups 141 toward the cavity of the ellipsoid structure 142. The multiple shock waves combine through interference and convergence to produce larger amplitude hydraulic shock waves that are directed into the production well 22 (see FIG. 6) environment. Each piezoelectric fiber composites/groups 141 is energized by a high voltage pulse generator 140B in communication with the micro-control system 140D in piezo control subsystem 140 to produce the shock wave. The polarization in the voltage terminals 143 and 144 of each piezoelectric fiber composites/groups 141 forces the shock wave to be generated toward the cavity of the ellipsoid structure 142. In FIG. 14 the voltage terminals 142 and 143 of the piezoelectric fiber composites/groups 141 are arranged in a latitudinal pattern with the terminal polarity alternating between the groups starting from the top of the ellipsoid structure 142 and working downward (see also FIG. 15). The terminal pattern in FIG. 14 and FIG. 15 illustrates a series of piezoelectric fiber composites/groups 141 that share a common power and ground terminal. The number of commonly connected piezoelectric fiber composites/groups 141 is dependent on the most efficient manner of distributing power and providing a uniform pressure distribution by the shock wave device 45. It may also be that the net electrical impedance to power all of the piezoelectric fiber composites/groups 141 at once is too low for the high voltage pulse generator 140B in piezo control subsystem 140. So connecting the piezoelectric fiber composites/groups 141 in specific clusters and then energizing the clusters in some type of sequenced or alternating manner can be more effective and practical (as seen also in FIG. 15). A high dielectric insulation 145 is utilized in the ellipsoid structure 142 and in between the voltage terminals 143 and 144 of the piezoelectric fiber composites/groups 141 to prevent arcing across the voltage terminals 142 and 143 and short circuiting the piezoelectric fiber composites/groups 141. Power to voltage terminals 143 and 144 of the piezoelectric fiber composites/groups 141 is supplied through the power cables 146 and 147 (see also FIG. 15), and that are protected by the main control cable conduit 65 for the shock wave device 45. A surface conductor 148 that would partially envelop the ellipsoid structure 142, functions as a common ground connection through cable 146 to power the piezoelectric fiber composites/groups 141. The surface conductor 148 is a composite material with the surface facing the piezoelectric fiber composites/groups 141 being made of a high dielectric material to function as an electrical insulator, and the opposite surface is an electrical conductor of sufficiently low surface impedance. A pressure coupling barrier 149 separates the ellipsoid structure and the oil/liquid mixture 92 of the well.

This embodiment presented in FIG. 14 and FIG. 15 also includes positioning sensors (not shown) inside the motor control and drive system 140C of the subsystem unit 140 to sense vertical, horizontal and radial displacement that is reported to the micro-control system 140D. The proximity sensors and/or digital optics 80 can detect the presence of metal so that alignment of the reflector or ellipsoid structure 142 to an opening in the metal production liner/casing 43 (corresponding to the well wall perforations 44—see FIG. 4) can be accomplished. The remaining items of FIG. 14 are in common with FIG. 7 would function identically so no other description is needed.

Figure 16:
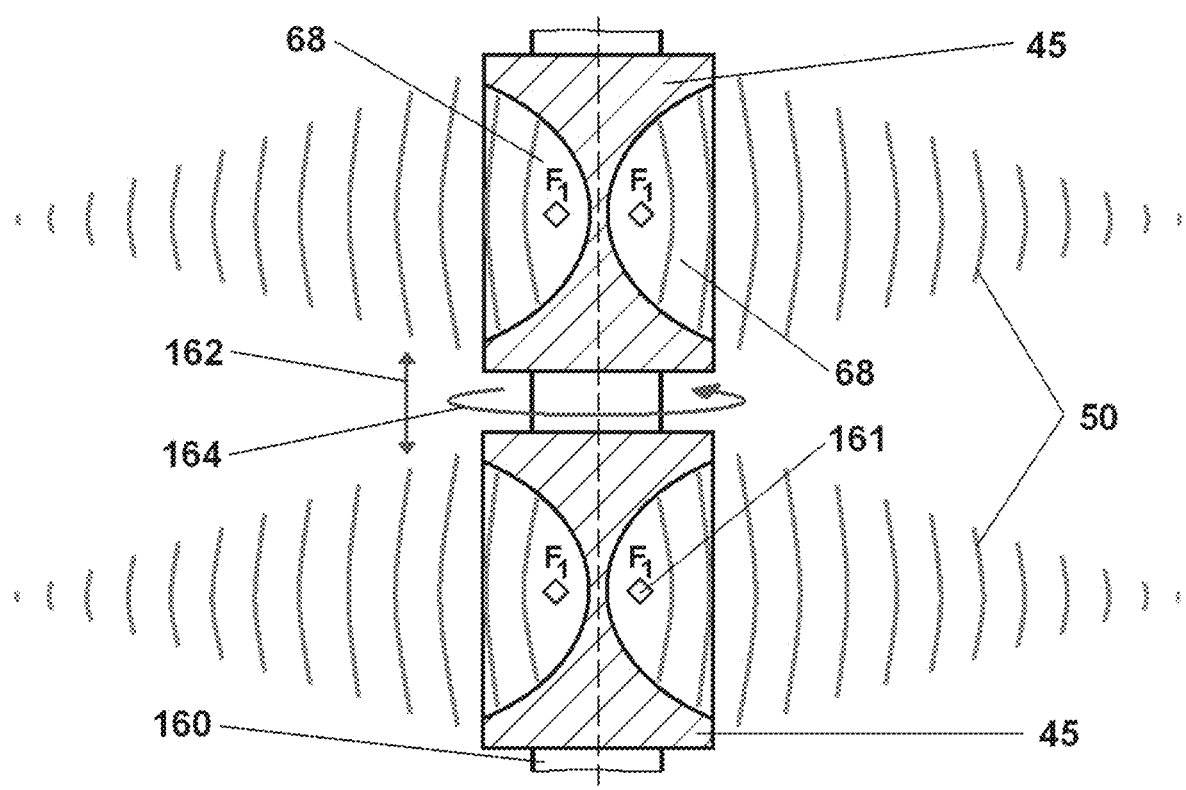
FIG. 16 is a diagram illustrating an adaptation of FIG. 7, FIG. 8, FIG. 9, and FIG. 10 with two opposite identical reflectors in a common device that are radially located every 180 degrees.

The embodiment of FIG. 16 shows the shock wave devices 45, which are similar in function with those presented in FIG. 7, FIG. 8, FIG. 12 and FIG. 13. Each of the shock wave devices 45 incorporate two (2) or more focused shock wave generators 68 used to send focused shock waves 50 into the oil reservoir 60, as shown in FIG. 6. This configuration has also multiple shock waves devices 45 that are stacked vertically inside the well/production bore 22 (see FIG. 6) using the supporting column 160. This arrangement allows a high productivity during shock wave stimulation of the oil field. Besides supporting the shock wave devices 45, the supporting column 160 represents tubular elements that have in their middle different cables and conduits for carrying control cables, power cables, liquid, etc., to allow the control of each shock wave devices 45 from the surface 62 (see FIG. 6). The same supporting column 160 is used to provide longitudinal movement 162 and rotational movement 164 of the shock wave devices 45, which allows the maneuverability through the well casing 43 by remote control to allow the proper alignment with the oil reservoir 60, as presented in FIG. 6. Plasma bubble formation point ($F_1$) 161 is where the focused shock waves 50 are generated, as presented in FIG. 7, FIG. 8, FIG. 12 and FIG. 13, and then focused into the oil reservoir 60. Through continuous or intermittent longitudinal movement 162 and rotational movement 164 the entire oil field/oil reservoir 60 can be stimulated using the shock waves in an intensive and efficient manner.

Figure 11:
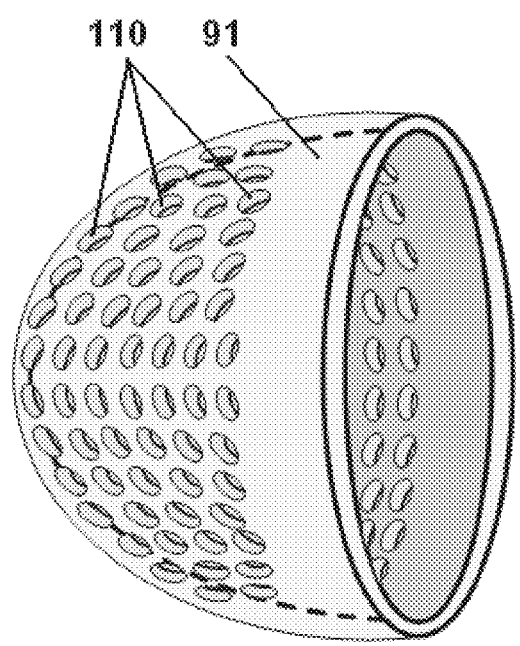
FIG. 11 is a diagram illustrating an example of the perforated reflector incorporated into FIG. 9 and FIG. 10.
Figure 17:
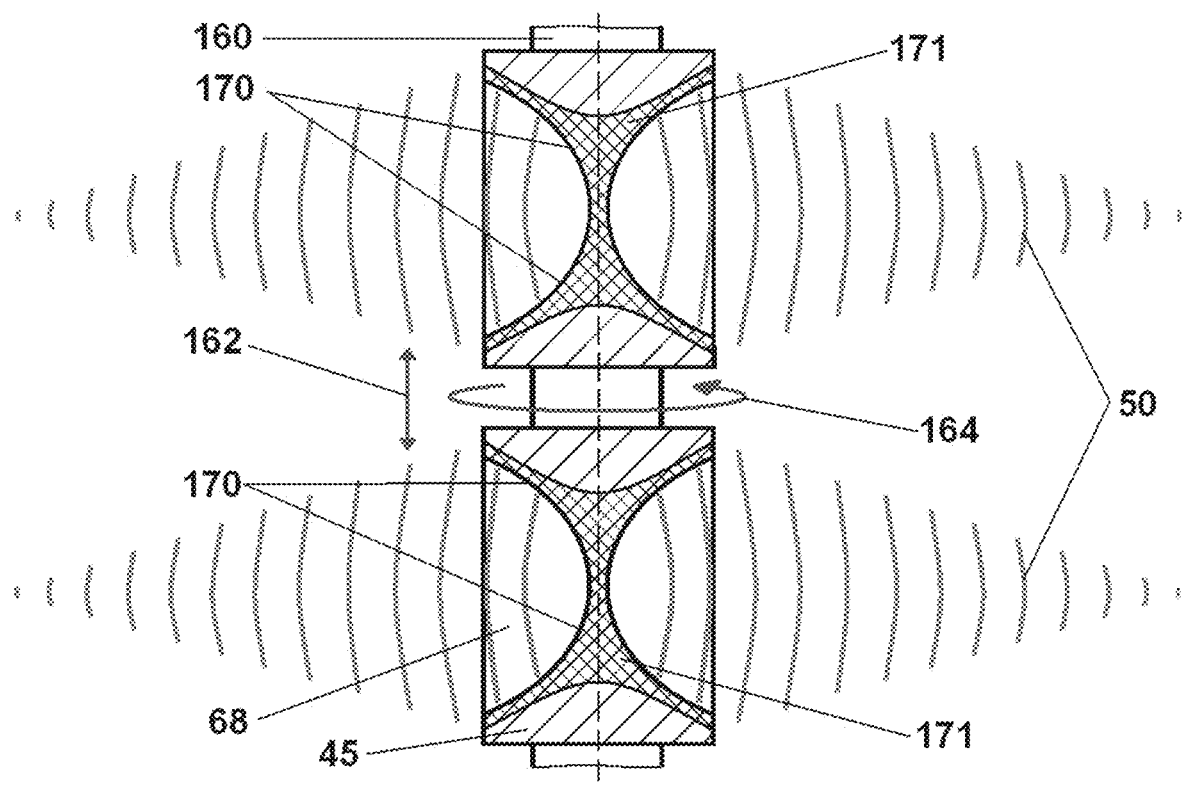
FIG. 17 is a diagram illustrating an adaptation of FIG. 14 and FIG. 15 with two opposite identical reflectors in a common device that are radially located every 180 degrees.

The embodiment of FIG. 17 shows the shock wave devices 45, which are similar in function with those presented in FIG. 9, FIG. 10 and FIG. 14, where the focused shock waves 50 are generated at the surface of the reflector surface 170 and not in the plasma bubble formation point ($F_1$) 161, as presented in the embodiment from FIG. 16. The special reflector 171 can be a truncated ellipsoid reflector 91 with large number of openings, as seen in FIG. 9, FIG. 10 or FIG. 11, or the ellipsoid structure 142 presented in FIG. 14 and FIG. 15. The rest of practical aspects of construction, functionality and efficiency are similar to those presented for the embodiment from FIG. 16.

Figure 18:
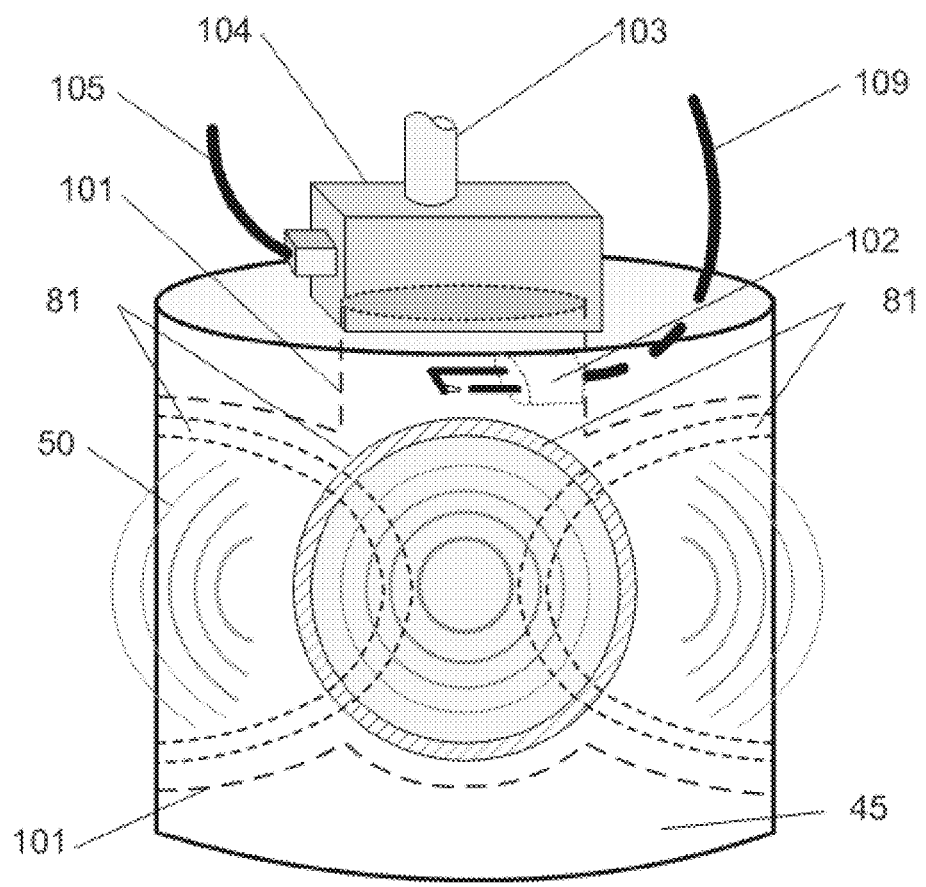
FIG. 18 is a diagram illustrating an adaptation of FIG. 10 with four perforated ellipsoidal reflectors in a common device that are radially located every 90 degrees.

The embodiment of FIG. 18 shows the shock wave device 45 that is an adaptation of FIG. 10 that is fitted with four (4) ellipsoid reflectors 81 positioned at 90 degree angles around the circumference of the shock wave device 45. The method of hydrogen generation and the control elements described in FIG. 10 would apply here. The combustion chamber 101 surrounds each ellipsoid so that the combustion pressure generated in combustion chamber 101 can be applied to the multiple individual pressure coupling membranes/apertures 106 of each ellipsoid reflector 81, as depicted in FIG. 10. The hydrogen enters through the gas conduit 103 and the opened $H_2$ fill valve 104 into the combustion chamber 101. The multiple sealed individual pressure coupling membranes/apertures 106 of the ellipsoid(s) 81 allow the gas to compress during the fill cycle, as depicted in FIG. 10. Once a specific pressure is reached the $H_2$ fill valve 104 is shut off through the $H_2$ fill valve control cable 105 leaving the pressure maintained by the sealed compartment of ellipsoid reflectors 81 and combustion chamber 101. The supplied voltage from power carrying cable 109 to the spark discharger 102 creates the combustion of the hydrogen resulting in multiple shock waves radiated through multiple individual pressure coupling membranes/apertures 106 described in FIG. 10 that combine through interference to produce larger amplitude focused shock waves 50 from each of the ellipsoid reflectors 81.

Figure 19:
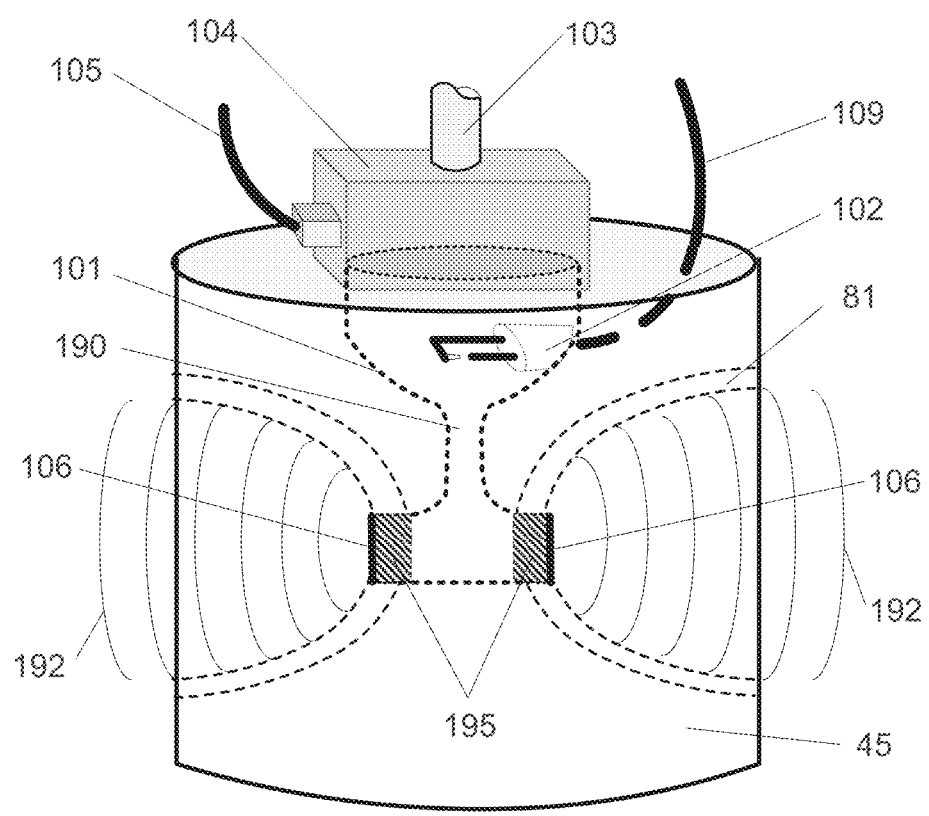
FIG. 19 is a diagram illustrating an adaptation of FIG. 10 with two parabolic reflectors located 180 degrees apart in a common device that are generating pseudo-planar waves.

The embodiment of FIG. 19 shows the shock wave device 45 that represents another adaptation of FIG. 10 embodying two (2) ellipsoid reflectors 81 positioned at 180 degrees apart. The method of hydrogen generation and the control elements described in FIG. 10 would apply here. Each ellipsoid reflector 81 has a single pressure coupling membranes/apertures 106 located at the bottom of each ellipsoid reflector 81 to couple the shock wave generated in ellipsoid reflector 81 during combustion. The shock waves exiting the ellipsoid reflector(s) 81 are pseudo-planar shock waves (unfocused) 192 since the source of the pressure wave is emanating from the bottom of the ellipsoid reflectors 81 and not at the ellipsoid's first focal point $F_1$ 161, as depicted in FIG. 16. The function of filling the combustion chamber 101 is identical to filling the combustion chamber 101 in FIG. 10 and FIG. 18. For the embodiment of FIG. 19 the difference is given by the fact that the combustion chamber 101 is designed with a throat 190 to compress the gas during the combustion phase. Due to the throat 190 the force of the pseudo-planar shock waves 192 exiting the reflector 81 is amplified by the exit velocity in the nozzle 195 area, which represents the area of the imaginary plane that bisects the pressure coupling interfaces 106.

Figure 20:
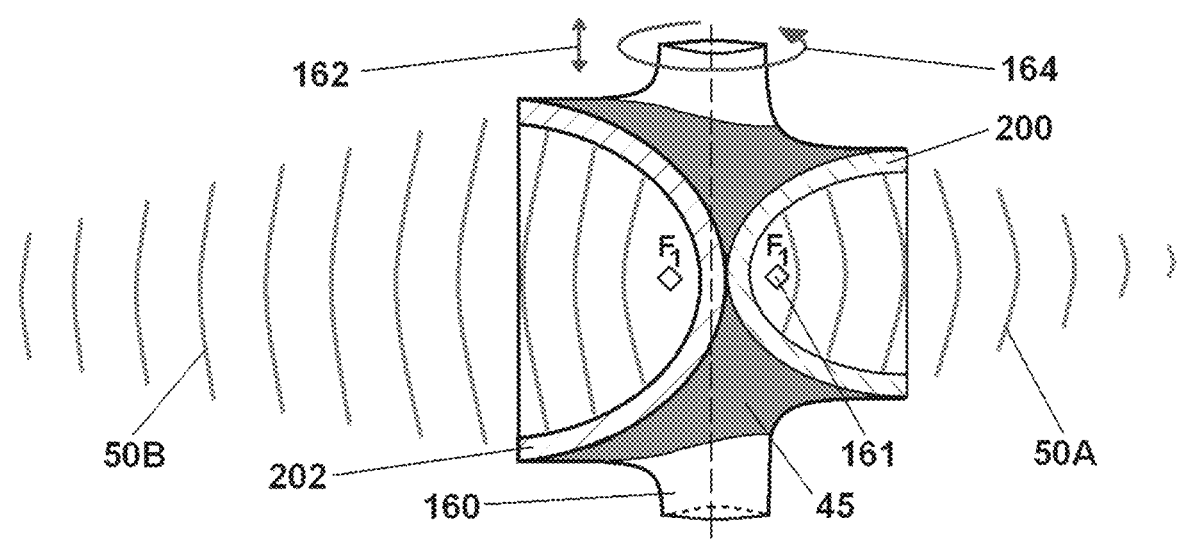
FIG. 20 is a diagram illustrating an adaptation of FIG. 7, FIG. 8, FIG. 9, and FIG. 10 with two opposite non-identical reflectors located every 180 degrees in a common device that provides different penetration for activating near-field and far-field oil reservoir.

The embodiment of FIG. 20 shows the shock wave device 45 that incorporates two (2) types of reflectors' geometry, the "near field" ellipsoid reflector 200 and the "far field" ellipsoid reflector 202. Using this construction of the shock wave device 45, which is using different reflectors, provided the near field focused shock waves 50A and the far field focused shock waves 50B that gives a very efficient way to stimulate the whole depth of the oil reservoir 60 (see FIG. 6), without the need to retrieve the column 160 to the surface 62 to exchange with new types of reflectors to reach far field after the near field stimulation. Longitudinal movement 162 and rotational movement 164 are helping the shock wave device 45 to cover the whole width of the oil reservoir 60 and in a 360 degrees manner around the rotational axis. The embodiment of FIG. 20 show two reflectors incorporated inside the shock wave device 45 that are similar in function with those presented in FIG. 7, FIG. 8, FIG. 12 and FIG. 13, which have a plasma bubble formation point ($F_1$) 161 where the focused shock waves 50A and 50B are generated. However, the shock wave devices 45 can be similar in function with those presented in FIG. 9, FIG. 10 and FIG. 14, where the focused shock waves 50A and 50B are generated at the surface of the reflector surface 170, as presented in FIG. 17.

Figure 21:
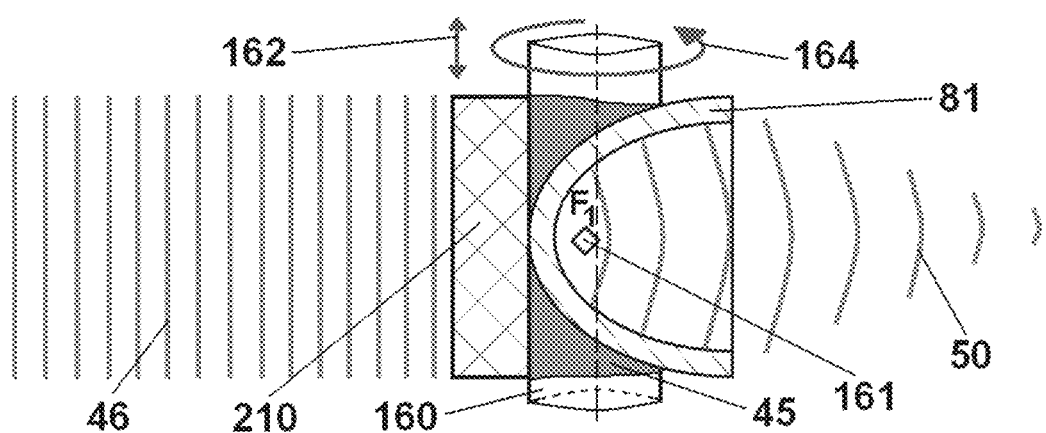
FIG. 21 is a diagram of two opposite non-identical reflectors located every 180 degrees in a common device that provides different penetration via focused and non-focused shock waves for activating near-field and far-field oil reservoir.

The embodiment of FIG. 21 shows the shock wave device 45 that incorporates two (2) modalities of generation of shock waves. The "near field" of the oil reservoir 60 is stimulated using focused shock waves 50 produced by the ellipsoid reflector 81 using a plasma bubble formation point ($F_1$) 161 similar in function with embodiments presented in FIG. 7, FIG. 8, FIG. 12 and FIG. 13. The "far field" of the oil reservoir 60 is stimulated using planar shock waves 46 that are produced by a piezoelectric crystal 210 or a construction similar to that presented in FIG. 14 that employs piezoelectric fibers. Longitudinal movement 162 and rotational movement 164 allows the shock wave device 45 attached to the supporting column 160 to shock wave stimulate the entire oil reservoir 60. This approach can be applied to very large oil reservoir 60, due to the fact that planar shock waves 46 can have dipper penetration in comparison to the focused shock waves 50.

Figure 22:
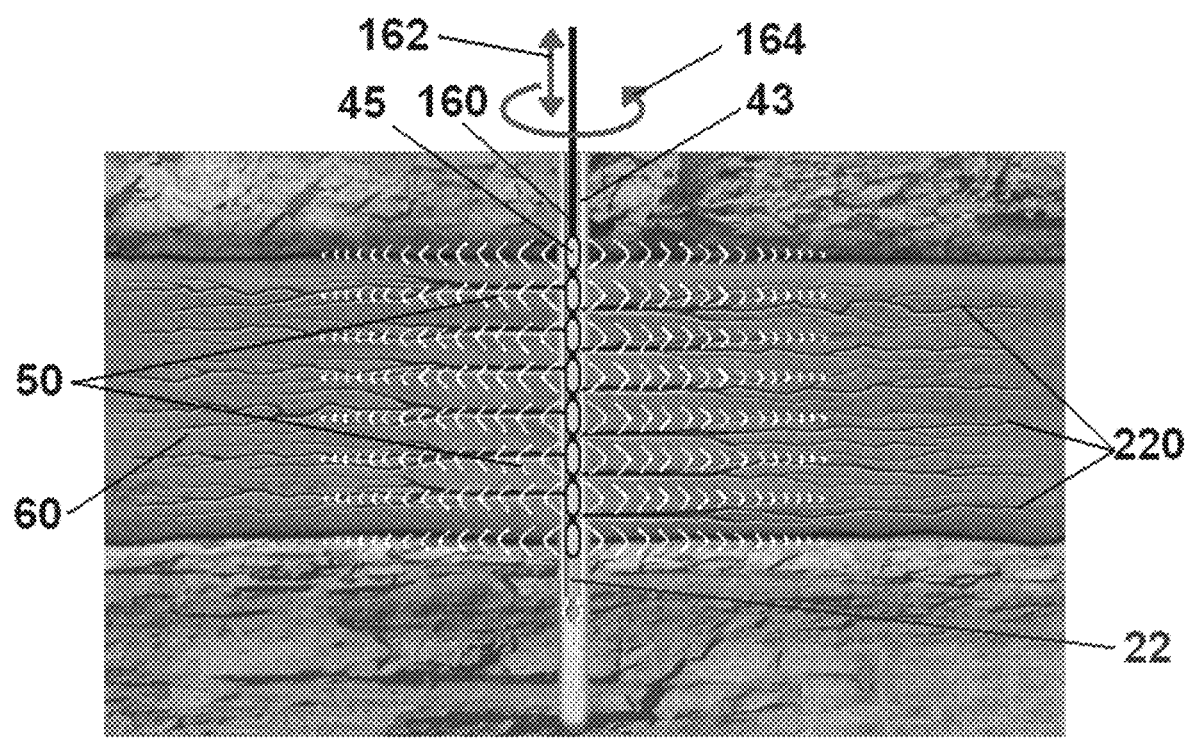
FIG. 22 is a diagram illustrating a battery of shock waves applicators stocked at 180 degrees and vertically in a common device that provides focused shock waves for activating the oil reservoir.

FIG. 22 is an illustration of the shock wave devices 45 that generate focused shock waves 50, which are used either for fracking or for IOR/EOR. The total number of shock wave devices 45 that are attached to the supporting column 160 is dictated by the oil reservoir 60 depth. Every shock wave device 45 is attached to previous shock wave device or to the supporting column 160 using an articulated joint (not shown), which allows easy access in the desired region of the well bore 22 and a modular structure with high flexibility in assembling a system that fits the needs of a particular oil reservoir 60. Furthermore, the shock wave devices 45 can have rollers that can allow easy longitudinal movement 162 and rotational movement 164 inside the casing/metal production liner 43, in order to correctly position the shock wave devices 45 in front of the rock perforations 220.

Due to the length of the fluid column above the oil reservoir 60 up to the surface 62 (see FIG. 6), the pressure in the area where the shock wave devices 45 are used could be significant. High pressures around the shock wave devices 45 will not allow cavitation formation, which will reduce the effects of the shock waves only to the high compressive forces produced in the oil reservoir 60. Furthermore, for the embodiments presented in FIG. 9, FIG. 10 or FIG. 14, which do not have a pressure coupling membrane 84 (as seen in FIG. 7, FIG. 8, FIG. 12 and FIG. 13), the shock waves' pressure might be diminished due to the high pressure produced by the column of fluid from above the oil reservoir 60. The same phenomenon of compressive pressure reduction and cavitation elimination can be encountered during the high pressure water flooding/fracking processes.

When the fluid/liquid/water inside the well bore 22 in the region of the oil reservoir 60 is desired to be at normal atmospheric pressure, the shock wave stimulation region can be isolated from the column of fluid present in between oil reservoir 60 and surface 62 (see FIG. 6) using production packers (not shown in FIG. 22 or FIG. 6). The usage of production packers creates a low pressure fluid/liquid/water space into the shock wave stimulation region, which will allow the full potential of the shock wave devices 45, due to combination of high compressive pressures (produced by the compressive phase of the shock waves) and the high velocity jets (formed by the collapsing of the cavitational bubbles generated by the tensile phase of the shock waves).

For fracking, the shock waves can be used in conjunction (in the same time) with high pressure fluid fracking process, when only the compressive phase of the shock waves will be active. By using the shock wave stimulation the pressures of the fracking fluid can be reduced, due to the additional pressurization produced by the shock waves.

Other option is to do shock waves stimulation before fracking to enlarge the rock perforations 220 (see FIG. 22), by insulating the oil reservoir 60 using production packers, to have a pressure equal or slightly higher than the atmospheric pressure, to use both compressive forces and cavitational jets in tandem. Shock wave stimulation can enlarge rock perforations 220, can sustain rock perforations 220 propagation in the oil reservoir 60 and can help with the miscibility of water with oil. This is why the subsequent fracking process will be done with less aggressive pressures and using a smaller quantity of water and additives, which can significantly reduce the cost of the operation and diminish the environmental impact of the fracking process. Even more, if the shock wave stimulation is very successful than the water flooding/fracking process can be totally eliminated.

Regarding IOR/EOR, as a tertiary method to increase oil/gas exploitation, the shock wave stimulation can be done at high pressures generated by other IOR/EOR methods (as thermal methods, gas injection methods or chemical methods) or can be applied at atmospheric pressures (low pressures) in a fluid/liquid/water, to change the viscosity and flow ability of the trapped oil inside small rock cracks or rocks pores.

The application of shock wave stimulation for IOR/EOR in conjunction with thermal methods and gas injection methods involves high pressure gases, which means that the shock wave devices 45 send shock waves through pressurized gases. In general the speed of shock waves is lower in gases and their efficiency is reduced in comparison to a liquid or solid medium. Due to the fact that the solids are more difficult to compress than liquids, while liquids in turn are more difficult to compress than gases, the difference in acoustic speed between air (c=343 m/s), water (c=1500 m/s) and solids (rocks or mud or sand, etc.) (c=4800-9200 m/s) can create tensile and shear stresses in solids. Furthermore, the speed of shock waves propagation in gases increases with the increase in their pressure and temperature.

When an acoustic wave encounters a medium with different impedance (density of medium multiplied with speed of sound in the unperturbed medium), then part of the wave will continue to propagate into the new medium (the transmitted wave) and part of the wave will be reflected back into the original medium (the reflected wave). In the case of normal incidence, where the propagation direction of the shock wave is perpendicular to the interface between different substances, the amplitude of the transmitted and reflected waves depend only on the change in impedance from one substance to another, which is referred to as the impedance mismatch. The water-to-stone/solid substance shock waves transmission is relatively high, with 75 to 95% of the energy transmitted into the stones/solids. The-air interface has an extremely small coefficient of shock waves transmission, and less than 0.1% of the energy of an acoustic wave in water will pass into air with the remaining 99.9% being reflected back into the water, which gives reduced efficiency of the shock waves produced in water that need to propagate afterwards in a gas medium. This is why for IOR/EOR that involve thermal methods and gas injection methods, only the embodiments presented in FIG. 10 and FIG. 14 can be used in the construction of the shock wave devices 45, due to the fact that the shock waves are not transferred from water to air and rather from pressurized air or solid piezoelectric crystals/fibers into air, which eliminates the 99.9% loss mentioned above.

The application of shock wave stimulation for IOR/EOR in conjunction with chemical methods involves the usage of liquid polymers that create an active mixture/solution with water, which will allow the usage of any embodiment described in FIG. 7, FIG. 8, FIG. 9, FIG. 10, FIG. 12, FIG. 13 and FIG. 14 in the construction of the shock wave devices 45. Due to pressurization of the water/polymer solution, only the compressive forces of the compressive phase associated with shock waves will be used for IOR/EOR in this case.

The application of focused shock wave stimulation as an independent method used for IOR/EOR (as presented in FIG. 22) must involve the usage of production packers (not shown in FIG. 22) to create below them in the well bore 22 an enclosed space that contains fluid/liquid/water at atmospheric pressures (low pressures), which will allow both shock waves compressive forces and cavitational jets to work in tandem for oil reservoir 60 stimulation.

Figure 23:
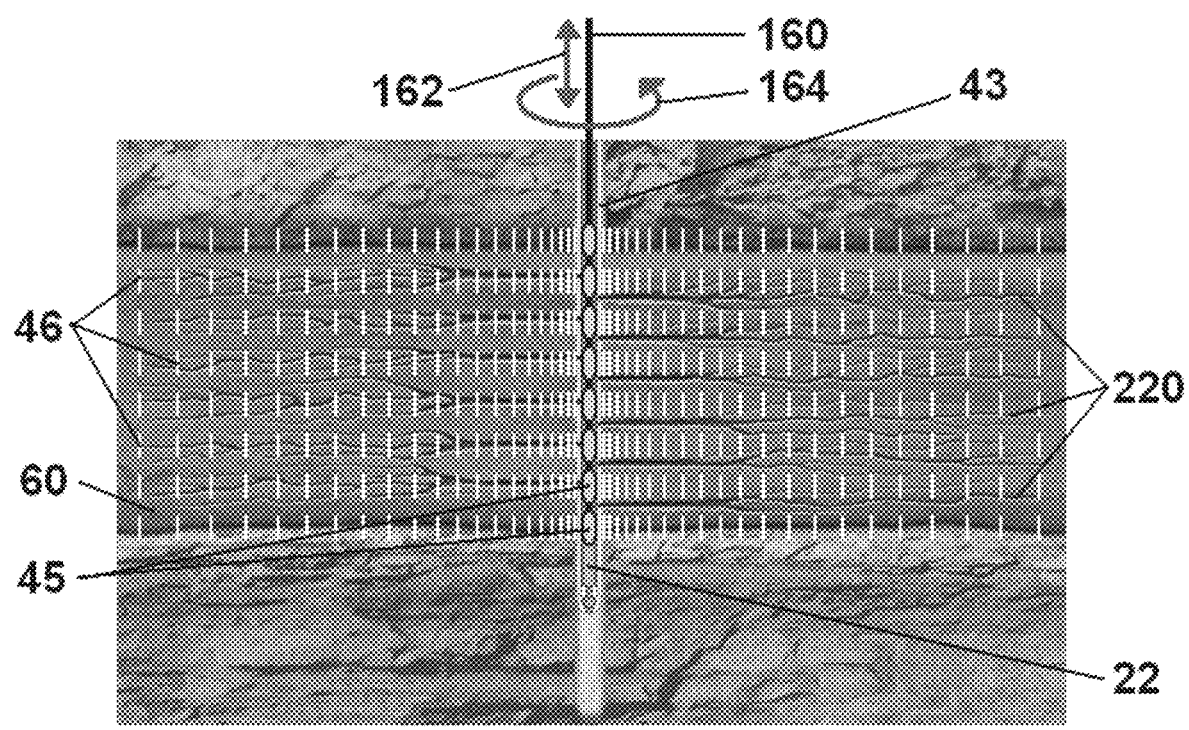
FIG. 23 is a diagram illustrating a battery of shock waves applicators stocked at 180 degrees and vertically in a common device that provides non-focused or planar or pseudo-planar shock waves for activating the oil reservoir.

The embodiment of FIG. 23 shows the shock wave device 45 that generate planar (unfocused) shock waves 46, which are used either for fracking or for IOR/EOR, The usage of planar (unfocused) shock waves 46 or pseudo-planar shock waves 192 (presented in FIG. 19) is dictated by their deeper penetration inside the oil reservoir 60 when compared to the focused shock waves 50 presented in FIG. 22. The rest of practical aspects of construction, functionality and efficiency are similar to those presented for the embodiment from FIG. 22.

Figure 24:
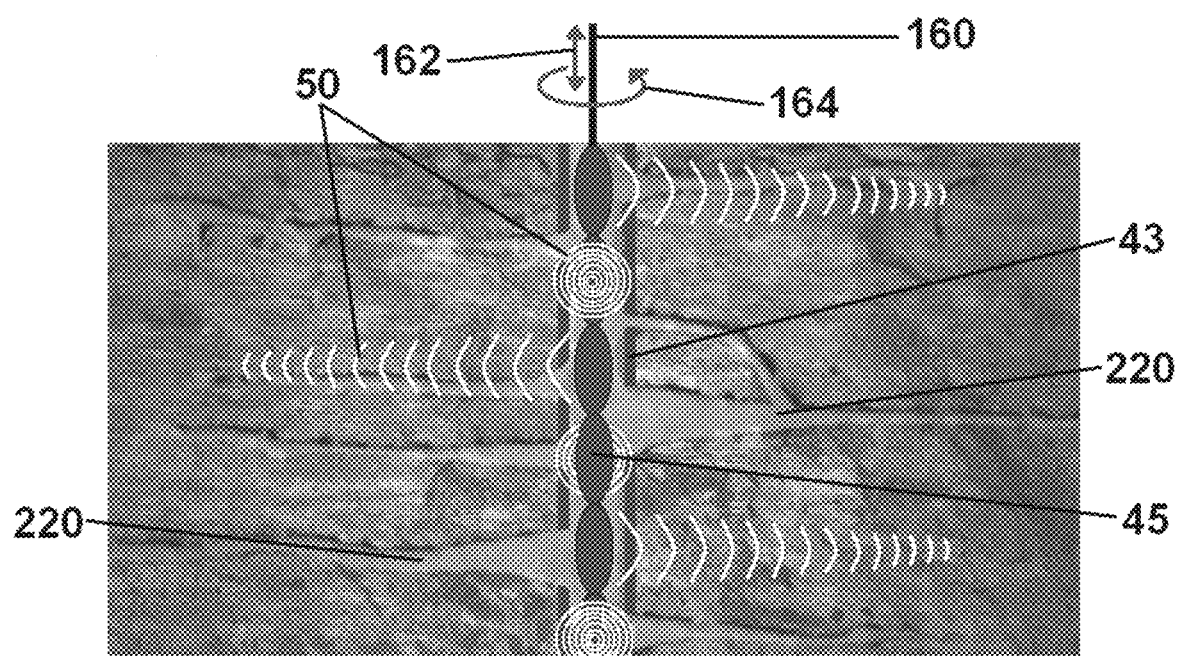
FIG. 24 is a diagram illustrating a battery of shock waves applicators stocked vertically at 90 degrees from the previous applicator in a common device that provides focused shock waves for activating the oil reservoir.

The embodiment of FIG. 24 shows the shock wave devices 45 stacked vertically on the column 160 and producing focused shock waves 50 rotated with 90 degrees for each consecutive shock wave device 45. This construction that has only one (1) reflector incorporated in each shock wave device 45 allows the usage of larger ellipsoid reflectors 81 (see FIG. 7, FIG. 8, FIG. 12 and FIG. 13) or truncated ellipsoid reflectors 91 (see FIG. 9 and FIG. 10) or ellipsoid structure 142 (see FIG. 14) for the same dimension of the well/production bore 22. The energy output of the shock waves is dependent on the reflection area, which translates for this embodiment in higher energies delivered in one shot when compared with shock wave devices 45 that contain twin reflectors (two per each device) or quadruple reflectors (four per each device). The shock wave stimulation of the entire oil reservoir 60 is done via the longitudinal movement 162 and rotational movement 164 of the supporting column 160, which align the shock waves through the casing/metal liner 43 in the direction of the rock perforations 220. The rest of practical aspects of construction, functionality and efficiency are similar to those presented for the embodiment from FIG. 22.

Figure 25:
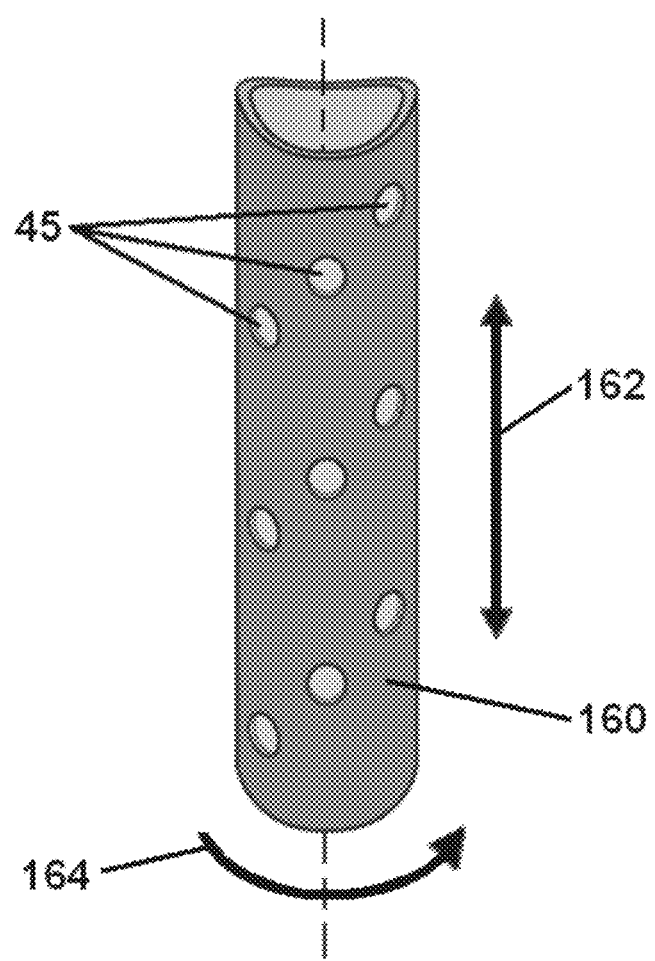
FIG. 25 is a diagram illustrating a battery of shock waves applicators positioned in a spiral pattern in a common device that provides focused shock waves for activating the oil reservoir.

The embodiment of FIG. 25 shows the shock wave devices 45 that are disposed in a spiral pattern around the supporting column 160. In this case the supporting column 160 serves as the housing for the shock wave devices 45, which allows a very rugged construction. The elimination of articulated joints between each shock wave devices 45 (as presented in FIG. 22, FIG. 23 and FIG. 24) allows also for an easier assembly (fewer components). The longitudinal movement 162 and rotational movement 164 of the supporting column 160 provide the shock wave stimulation of the entire oil reservoir 60 (see FIG. 6) by aligning the shock waves through the casing/metal liner 43 in the direction of the rock perforations 220, as shown in FIG. 24. The rest of practical aspects of construction, functionality and efficiency are similar to those presented for the embodiment from FIG. 22.

The embodiment of FIG. 26 shows the usage of half-pipe reflectors 260 that are attached to the supporting column 160. The cross section of the half-pipe reflectors 260 is an ellipse, which means that these reflectors produce focused shock waves 50 that are concentrated in a focal volume that has the shape of a small cylinder positioned parallel to the longitudinal axis of the well/production bore 22, which provides high efficiency for the "near" field shock wave stimulation and less efficiency for "far" fields. In contrast, for ellipsoidal reflectors 81 seen in FIG. 7, FIG. 8, FIG. 12 and FIG. 13 or the truncated ellipsoid reflectors 91 seen in FIG. 9 and FIG. 10 or the ellipsoid structure 142 seen in FIG. 14 the focal volume has a "cigar" shape orientated perpendicular to the longitudinal axis of the well/production bore 22, which makes them fitted for both "near" field and "far" field shock wave stimulation of the oil reservoirs 60 (see FIG. 6). The focused shock waves 50 are directed to get through the casing perforations 264 and into the rock perforations 220 by using the longitudinal movement 162 and rotational movement 164 of the supporting column 160.

In the embodiment from FIG. 26 the shock waves are created by activating each firing device 262 concomitantly or in a sequential manner. The structure can send the focused shock waves 50 in a direction perpendicular to the longitudinal axis of the well/production bore 22 or at any angle between 30 and 90 degrees from the longitudinal axis of the well/production bore 22, which can help avoiding aquifers or any unwanted structures towards the surface 62 (see FIG. 6), in the case of horizontal well/production bores 22. Although it was not specifically presented for the embodiments presented before the one from FIG. 26, the focused shock waves 50 or planar shock waves 46 or pseudo-planar shock waves 192 can all be directed between 30 and 90 degrees from the longitudinal axis of the well/production bore 22. The rest of practical aspects of construction, functionality and efficiency are similar to those presented for the embodiment from FIG. 22.

The embodiment of FIG. 27 shows the shock wave device 45 that has a special construction, which allows very deep penetrations inside the oil reservoir 60. To accomplish that the "far" field focused reflectors 270 (they have a large major elliptical axis) are positioned on an elliptic supporting beam 274, which mimics a portion of an ellipse with a very large focal/major elliptical axis. Due to close proximity positioning of each "far" field focused reflectors 270 combined with their specific orientation given by the elliptic supporting beam 274 allows the initial focused shock waves 50 to interfere with each other during their propagation to create combined pseudo planar focused shock waves 275 immediately after passing the casing 43 and inside the oil reservoir 60. Practically, the eight (8) "far" field focused reflectors 270 (as depicted in FIG. 27) act as one large reflector that has the geometry of the elliptic supporting beam 274, which allows very deep penetrations inside the oil reservoir 60 corresponding to the very large focal/major elliptical axis of the elliptic supporting beam 274. The dimension of the elliptic supporting beam 274 can be adapted to accommodate the size of any well/production bore 22. The number of "far" field focused reflectors 270 that sit on the elliptic supporting beam 274 is dictated by the characteristics of each oil field and should not be less than three (3) and no more than thirty (30). The shock wave device 45 can be correctly positioned in front of the casing perforations 264 that correspond to the rock perforations 220 via the longitudinal movement 162 and rotational movement 164 of the supporting column 160. The rollers 272 attached to the elliptic supporting beam 274 are used to facilitate the navigation of the shock wave device 45 through the casing 43 on its way from the surface 62 to the oil reservoir 60 (see FIG. 6) and to provide easy maneuverability for the longitudinal movement 162 and rotational movement 164 of the supporting column 160.

All embodiments that were presented above require a high longevity/functional life of the shock wave devices 45, which dictates a rugged construction and modalities to generate shock waves that do not require the exchange of equipment down the well bore 22, during normal shock wave stimulation of oil reservoir 60 (see FIG. 6), which can last from a day to one week, in most of the cases. Any of the embodiments presented above can be used as presented or in different combinations, which based on the complexity and characteristics of each oil reservoir 60 and its position below the surface 62 (see FIG. 6) will allow the complete shock wave stimulation of the oil reservoir 60. This can be accomplished via the reflector's design, a combination of different reflectors inside the shock wave devices 45, the number of reflectors per each shock wave devices 45, the number of shock wave devices 45 attached to the supporting column 160 or elliptic supporting beam 274, the longitudinal movement 162 and rotational movement 164. Of course, the dosage of the shock waves (number of shock waves, frequency and energy setting) will also dictate the efficiency of oil stimulation. It is recommended that the number of shocks, used by each shock wave device 45 for stimulation of oil reservoir 60, to be between 300,000 shots up to 5,000,000 shots, with frequencies ranging from 0.5 up to 10 Hz and with output energies in excess of 1 kJ up to 1 MJ.

Maintenance and Cleaning of Energy and Water Installations

Both the large compressive pressures and high-speed cavitational jets that are generated by the shock waves in fluids can be successfully used in the maintenance and cleaning of existing oil installations/infrastructure and for any water installations associated with this infrastructure. The shock waves can increase convection in liquids by two mechanisms known as acoustic streaming and microstreaming. The acoustic streaming represents the momentum that is transferred to the liquid from directed propagating sound waves (pressure waves) causing the liquid to flow in the direction of the sound propagation. During the cavitation phase, cavitation sets up eddy currents in the fluid surrounding the vibrating bubbles. In the vicinity of vibrating gas bubbles the surrounding liquid is subjected to rotational forces and stresses producing a microscopic shear flow/fluid movement called micro-streaming. Also the compressive forces and high velocity cavitational jets produced by imploding cavitation bubbles, when directed towards solids can disturb and dislodge solid particles. In general, after shock waves application a number of mechanical, acoustical, chemical and biological changes occur in a liquid due to acoustic cavitation that can help with the cleaning of fluids and installations used in energy exploration and exploitation.

Based on the above mentioned mechanisms, the shock waves can be used for the following maintenance and cleaning activities:

Separate oil from water that was used during fracking

Kill microbes carried from the oil reservoir by the waters used for IOR/EOR

Separate solids, gases, foams from waters that were used for IOR/EOR

Eliminate/prevent depositions on filters/filtration membranes used for oil/energy production surface equipment or for water treatment systems Clean the wellbore during workovers Eliminate biofilms and sludge accumulation from energy industry infrastructure Remove asphaltene, paraffin and scale deposits from piggable and unpiggable pipes used in energy installations Eliminate the ice plugs from inside the pipes running in the arctic environment Water Treatment/Cleaning Shock waves that produce high compressive pressures and generate significant cavitation, which can be used for the following applications related to water treatment/cleaning:

Turbidity and total suspended solids/pollutants reduction

Water disinfection

Filtration membranes cleaning

Algae removal

Water softening

Turbidity it is caused by suspended substances or dissolved substances such as clay, silt, oil, finely divided inorganic and organic matter, soluble colored organic compounds, plankton and other microscopic organisms. Conventional methods for decreasing turbidity and of reduction of total suspended solids/pollutants in water are rapid/slow filtration, microfiltration, ultrafiltration and coagulation/flocculation. The acoustic streaming, micro-streaming and cavitational jets can move, in the direction of the shock waves, suspended or dissolved substances, immiscible substances (oil and foams), solids/pollutants and microorganisms from water, based on their different acoustic speeds/acoustic impedance. Through this fluid movement towards filtration/separation system or by being an initiator of chemical reactions, shock waves can rapidly and efficiently clean harmful substances and microorganisms from waters. Furthermore, systems can be built that have half of the shock waves traveling through water (with the speed c=1500 m/s) and half through air (with the speed c=343 m/s) having the shock wave reflector partially submerged in water, which can accentuate the acoustic streaming inside the fluid and at its separation surface from air (due to the difference in acoustic speeds between air and water), where very light particles (oil, foams) accumulate and thus helping with their separation from water.

Shock waves can destroy microbes that contaminate fluids. Water disinfection process is used to remove microorganisms and can be done by different methods such as the use of ultraviolet light and chemical substances, as chlorine, hypochlorite, chloramines, chlorine dioxide, bromine and ozone. Shock waves, as an independent method, can inactive microorganism using several mechanisms that are mainly based on the acoustic cavitation. The first mechanism could be chemical attack by the hydroxyl radicals generated during cavitation bubbles collapse (the high heat breaks the water into ionic components). Secondly, the high velocity jets produced by imploding cavitation bubbles, the transient sonoluminescence and high temperatures resulting from bubble collapse can cause cell death by affecting/breaching their outer membrane. Thirdly, the micro-streaming produced by cavitation bubbles oscillation generates shear forces that can damage the microorganism shells. Due to the breach of the microorganisms outer shells by the shock waves the chemical oxidants can now easily diffuse into them and destroy the microorganism structures. This process has clearly applications in separating oil from water and foam generated during fracking process for oil/gas. Furthermore, an in-line system can be used to clean fracking waters or fluids used for IOR/EOR processes in the oil industry. Obviously, the same process can be adapted for cleaning any industrial or municipal waters.

Membrane technologies are widely used for separation of solids from liquid. The most common membrane processes are microfiltration (0.1-10 micron pore size), nanofiltration (2-100 nm pore size), ultrafiltration (0.5-2 nm pore size), electrodialysis, and reverse osmosis (<0.5 nm pore size). During the filtration process polarization and fouling affects membrane filtrations efficiency. Membrane fouling is a process where solute or particles such as natural organic matter, silica, iron oxides, calcite, and clays deposit onto a membrane surface or into membrane pores in a way that degrades the membrane's performance. The fouling can be colloidal (clays, flocs), biological (bacteria, fungi), organic (oils, polyelectrolytes, humics) and scaling (mineral precipitates). Mechanical (sponges, jets, etc.), biological (biocides) and chemical (acids, alkalis, surfactants, sequestrates and enzymes) methods can be used to clean the affected membranes. These methods or the cleaning necessary after their application require the shutdown that of the installation. The usage of shock waves can be done as an online operation (can be use during filtration time), without any secondary pollutant, transportation and handling problems. In the same time shock waves can enhance disinfection of the distribution systems due to presence of hydrogen peroxide ($H_2O_2$) and hydroxyl free radicals ($OH^-$). Shock waves are capable of preventing the deposition of particles that lead to fouling, can also disturb and dislodge particulate matter/biofilms, and enhance the dissolution of substances trapped on membrane surfaces, which can eliminate downtimes and prevent reduction in filtration efficiency. Even more, the shock waves can act on any type of filter/membrane used in oil/gas, water management, heat/exchangers towers, etc., regardless of the material used in their construction (polymers, metals, ceramics, etc.).

Algae growth is a common problem in the water treatment plants and water reservoirs. These are autotrophic organisms, ranging from unicellular to multicellular forms. There are various strategies to control and remove algae from water such as, dissolved air flotation, covering of basins and filters, advanced oxidation processes, ozonation, aeration, coagulation/flocculation, bubble curtains, mechanical equipment used to clean basins, chlorination for disinfection etc. Shock waves, as an independent method, can inhibit the growth of algae and also push them towards a region of the basin that is cleaned with mechanical equipment. Any of the above mentioned methods used for algae cleaning can be employed concomitantly with shock waves process.

Water hardness is produced by bivalent and trivalent cations such as calcium ($Ca^{2+}$), magnesium ($Mg^{2+}$), aluminum ($Al^{2+}$, $Al^{3+}$) and iron ($Fe^{2+}$, $Fe^{3+}$). Water hardness causes the development of hard foams, scale formation in pipes and water cooling towers, which decreases heat exchange capacity and produces membranes clogging. Conventional methods for hardness removal are lime-soda process, ion exchange, electrocoagulation, electrodialysis and nanofiltration. Shock waves can speed-up the chemical reactions by removing the cations to soften the water. When hard foams and scales are already formed, shock waves can break them down through acoustic streaming, micro-streaming and cavitational jets.

Figure 28:
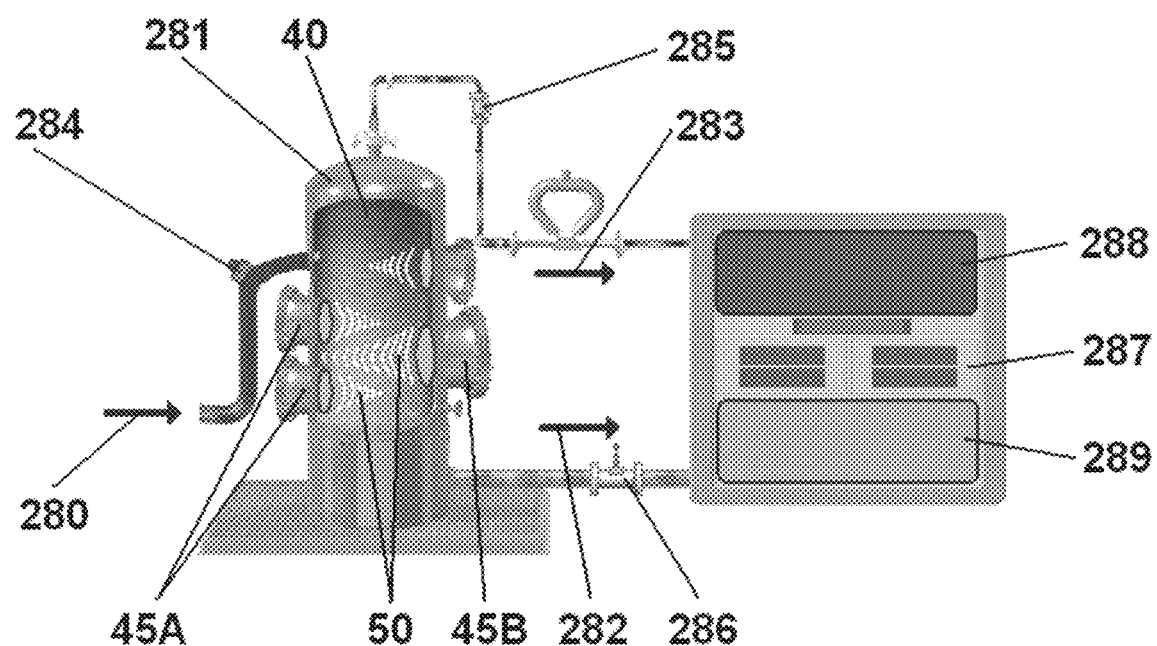
FIG. 28 is a diagram illustrating a station used to separate oil from water using multiple focused shock waves applicators positioned around the separation reservoir/enclosure.

The embodiment of FIG. 28 shows the shock wave device 45A (smaller size) and 45B (larger size) that are incorporated in water/oil separation enclosure 281. This enclosure has a cylindrical shape with shock wave devices 45A and 45B positioned on its side. In this way different intensity focused shock waves 50 are pushing in radial direction the well fluid mixture 280, which helps with pushing/separation of oil 40 towards the top of water/oil separation enclosure 281. Oil collection 283 from the top of the water/oil separation enclosure 281 is done with the help of the oil suction pump 288. On its turn, the water suction pump 289 is used to move the separated water from the bottom of the water/oil separation enclosure 281, as indicated by the water collection 282 arrow. The volumes of well fluid mixture 280, oil collection 283 and water collection 282 are regulated automatically from the control panel 287 via well fluid mixture valve 284, oil valve 285 and water valve 286. To accomplish an efficient control of the process the control panel 287 uses computerize systems and monitoring sensors that are not shown in FIG. 28. This process allows a fast and economical process of separating the oil from water used during fracking/water flooding process or for any IOR/EOR processes that involve the usage of water. The process can be applied to pressurized or non-pressurized well fluid mixture 280. The non-pressurized system can be accomplished by depositing the well fluid mixture 280 in large containers and then pump it at relatively low pressures into the water/oil separation enclosure 281.

After water collection 282 from the embodiment presented in FIG. 28, subsequent similar systems can be used to break/reduce the size of solid particles (similar to lithotripsy), to separate contaminants and solid particles, to kill microbes, etc., for complete cleaning of the waters, which subsequently can be re-used during fracking and for any IOR/EOR processes. The position of the shock wave devices 45A and 45B can be chosen to be at the top, bottom, or the side of the water/oil separation enclosure 281, based on the type of particles that needs to be separated from water. The shock waves must move solid particles in a downwards direction, which will dictate the position for the shock wave devices 45A and 45B at the top of the water/oil separation enclosure 281. To separate substances (solids or fluids) that are less heavier than water, the position of the shock wave devices 45A and 45B should be at the bottom or on the side of the water/oil separation enclosure 281, to generate an upwards movement. For killing microbes the shock wave devices 45A and 45B can be positioned at the top, bottom, or the side of the water/oil separation enclosure 281. When using multiple subsequent modular systems (as the one presented in FIG. 28), a dedicated stationary station for cleaning waters can be assembled on the surface 62, in close proximity to the well/production bore 22 (see FIG. 6).

Figure 29:
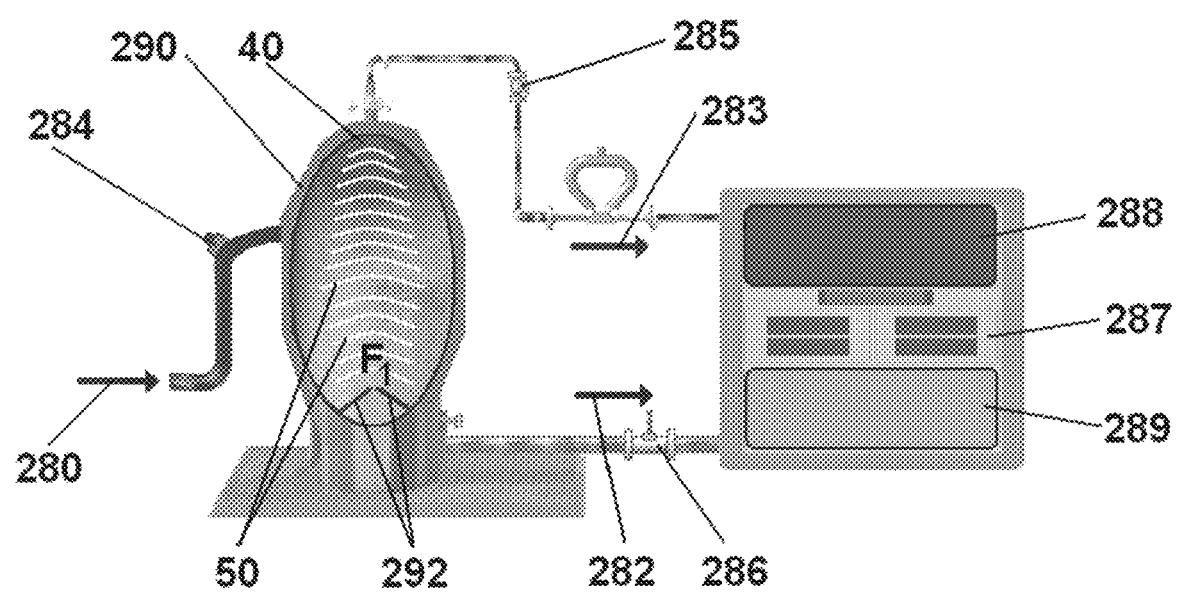
FIG. 29 is a diagram illustrating a station used to separate oil from water using a full ellipsoidal enclosure to produces shock waves.

To increase the efficiency of oil separation from water, the embodiment of FIG. 29 incorporates a full ellipsoidal separation enclosure 290 that pushes the oil towards the top of the enclosure in a directional vertical movement, via the focused shock waves 50, which produce large pressure gradients. Knowing that the potency of shock waves 50 increases with the reflective surface, it is clear that the full ellipsoidal separation enclosure 290 will be able to generate higher pressure gradients throughout its whole volume when compared to the shock wave devices 45A and 45B, presented in the embodiment from FIG. 28. For this system to work, at the bottom of the full ellipsoidal separation enclosure 290 a plasma bubble generation system 292 must be present and fire in the first focal point $F_1$ of the ellipsoidal separation enclosure 290. This will allow an optimum energy transfer that can create high pressure shock waves for increased efficiency of oil separation from water. For this embodiment the plasma bubble generation system 292 can be positioned either on the bottom or at the top of the ellipsoidal separation enclosure 290 and the collection of different components can be done wither at the top (for lighter substances) or at the bottom (for heavier substances) of the ellipsoidal separation enclosure 290. The rest of practical aspects of functionality, applicability, and controlled directional movement are similar to those presented for the embodiment from FIG. 28.

Both systems from FIG. 28 and FIG. 29, presented as embodiments for separating oil from water, can be also used for other purposes as decreasing turbidity, reduction elimination of total suspended solids/pollutants, water disinfection, elimination of algae growth and reduction of water hardness, as part of dedicated stationary stations for cleaning waters. To accomplish that, different sizes of the shock wave devices 45A/45B or of the ellipsoidal separation enclosures 290 can be chosen for tuning the shock waves energy for a specific application. It is well known that the output of the shock waves is dependent on the dosage (number of shocks, frequency and energy setting), geometry of the ellipsoidal reflector, total area of reflection, chemical additives inside the aqueous medium, etc. This is why the shock wave devices 45A/45B or the ellipsoidal separation enclosures 290 can have different geometries for distinctive applications. Furthermore, the shock wave devices 45A/45B or the ellipsoidal separation enclosures 290 may have different geometries for different species of microbes to create less or more energy based on their resistance.

Figure 30:
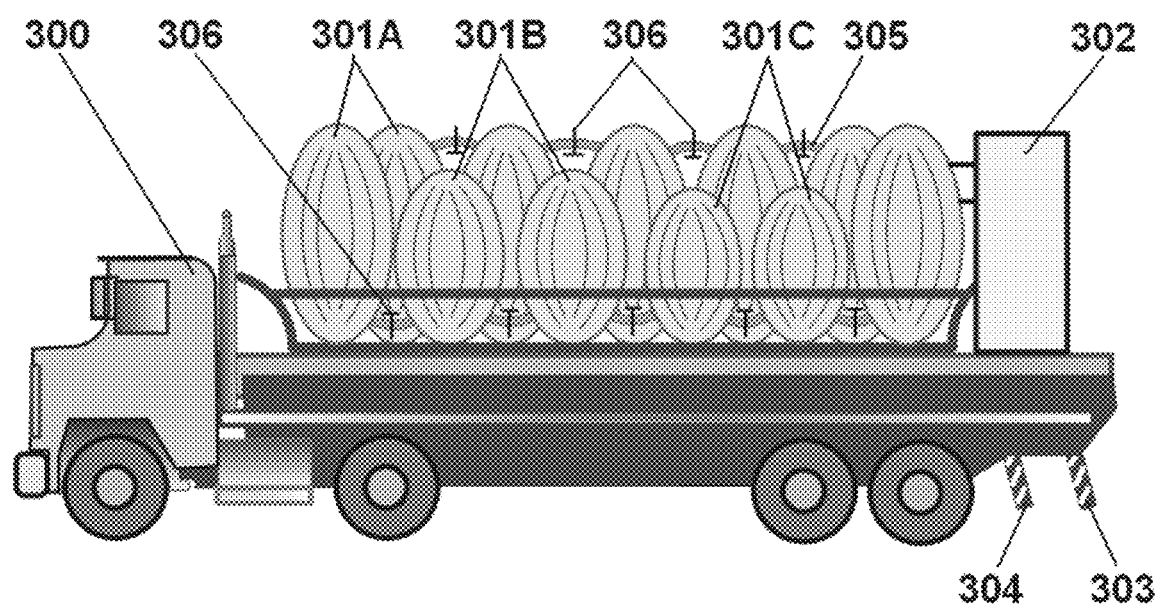
FIG. 30 is a diagram illustrating a truck mobile station that uses multiple shock wave ellipsoidal enclosures for cleaning residual fracking waters.

Compared with the fixed/stationary embodiments presented in FIG. 28 and FIG. 29, the embodiment of FIG. 30 shows a mobile system for water treatment/cleaning. Practically, large size full ellipsoidal cleaning enclosures 301A, medium size full ellipsoidal cleaning enclosures 301B and small size full ellipsoidal cleaning enclosures 301C are installed on a truck 300, which allows the movement of the system from one site to another based on the necessities. By creating a fleet of trucks 300, it will allow the access to remote sites and eliminate the investment necessary to assemble and disassemble dedicated stationary/semi-permanent stations for cleaning waters. The flow of water in between different ellipsoidal cleaning enclosures 301A. 301B and 301C is done via in-between enclosures pipes 305. These pipes 305 can be connected to the bottom or the top of the different ellipsoidal cleaning enclosures 301A. 301B and 301C, as dictated by the certain functionality/targeted application for the ellipsoidal cleaning enclosures 301A. 301B and 301C. The water flow from one enclosure to another can be continuous or intermittent and it is controlled via separation valves 306. The mobile unit/truck 300 can be connected to water supply pipes, to another truck 300 or collecting reservoirs for the water, via water "in" pipe 303 and water "out" pipe 304. The functionality of the mobile water cleaning system, installed on the truck 300, is controlled by the control console 302.

During oils spills there are three (3) major techniques that used to collect the oil. The first one is skimming that uses different devices (disks, drums, etc.) to adhere to the oil and thus collect it from the water. The second technique is using sorbents, which are big mops that are used to collect the oil. The third technique is using dispersants that are a mixture of surfactants and solvents that break up an oil spill into droplets. By breaking it up, microbes and the environment can more easily biodegrade the oil. New techniques, using microspheres (to create magnetic oils that can be collected using big magnets) or chemicals that conglomerate the oil, are recently employed. If any of the above techniques allow the separation of oil from the collected byproducts, may become very attractive from financial point of view. This is why the same embodiments presented in FIG. 28, FIG. 29 or FIG. 30 can also be used for cleaning and separating oil from the byproducts/water that are collected during oil spills, based on the same principles and functionality presented for each embodiment.

Maintenance of Oil/Energy Industry Infrastructure

During exploitation, transportation and processing of oil and in general for the energy industry requires casings, pipes, and complex installations, which during usage can get clogged due to scale, asphaltene, paraffin deposits, biofilms formation and accumulation of sludge. Scale, asphaltene and paraffin deposits represent some of the most significant production and well integrity challenges in oil and gas production. These deposits lead to significant production decline if untreated.

Scale is a mineral deposit that can occur in the tubing, the artificial lift system, completion accessories, oil field perforations, etc. Scale depositions occur when solution equilibrium of the water is disturbed by pressure and temperature changes, dissolved gases or incompatibility between mixing waters or by the water hardening. Scale deposits are the most common and most troublesome damage problems in the oil field and can occur in both production and injection wells.

Asphaltenes are large complex organic components present in the oil phase, which agglomerate and deposit when conditions exist during production that destabilize their associated resins.

Paraffin precipitates out of waxy crude oils when there is a slight change in equilibrium conditions, causing a loss of solubility of the wax in the crude. A lowering in temperature is the most common cause of paraffin precipitation, though many other factors can affect the process.

Pipeline integrity is an increasing challenge to the energy industry as the infrastructure is ageing and new field developments are being introduced in both deep and remote areas of the world. The current development of the offshore market shows an increased focus upon subsea field development, which puts new challenges in maintaining the undersea infrastructure. Production flow lines and other in-field pipelines are hard to inspect and clean due to the fact that they are practically unpiggable or the costs are prohibitive for undersea pipelines. Other examples of unpiggable pipelines in the oil/gas industry are typically refinery pipe work, off-loading lines and transport pipelines. Practically, more than one third of the world's pipelines are "unpiggable".

The available technologies are highly dependent upon pipe length and its location (e.g. refinery pipes, subsea flow line, nuclear plants cooling pipes, etc.). The pipes also have different dimensions on one segment, which makes them unpiggable for traditional pigging companies (use "pigs" of standardized dimensions to clean the interior of pipes). Traditional pigging often requires that all conditions are perfect, for example; pressure rating, no severe intrusions, weak joints, cracks etc. With pipelines getting older, diameters varying within the same pipe and many featuring bend restrictions and unfriendly T section fittings the perfect conditions can often be few and far between.

It is desirable for a "pig" system to draw power from the fluid flow while travelling against the direction of flow and to carry a payload to perform a specific task and returns with the flow, on demand or on encountering an impassable obstruction. Furthermore, it should be a modular construction for ease of modification to suit individual applications, articulated to better negotiation of bends, and to travel at a speed suitable to the individual application.

Based on the lithotripsy experience, the shock waves are able to break, disturb and dislodge solid sediments (scales, asphaltene, paraffin), biofilms and sludge deposits that are present inside the well bores or any pipes or tanks that are used in the energy and water management installations. Due to the acoustic impedance mismatch between a fluid and a solid, and due to the collapse of cavitation bubbles with micro jets that are directed towards a solid/semi-solid surface and thus contribute to their fragmentation.

It is well known that even small shock wave devices are capable of generating high compressive forces and cavitational jets that are able to break/dislodge strong solid substances, which makes them very attractive to be used in the small size unpiggable pipes. This provides the opportunity for the shock wave devices to be suitable for both piggable (large size pipes) and unpiggable structures with small size pipes and with small bending radiuses. Depending on the accessibility of the targeted pipe, shock wave devices can be used from outside the pipe or can be launched inside the pipe using designs that include spring-loaded rollers to reduce friction between the device and the pipe. The shock wave devices used for cleaning pipes can be delivered as separate modules that can be attached to already existing "pigging" systems. Furthermore, the shock wave devices can be used in conjunction with any chemicals that are currently used in cleaning piggable and unpiggable pipes. In this case shock waves can enhance the penetration of the chemicals inside the sludge/deposits or can be used as initiators of certain chemical reactions, due to the transient high temperatures and photoluminescence phenomenon generated during collapse of the cavitation bubbles in the targeted area.

Figure 31:
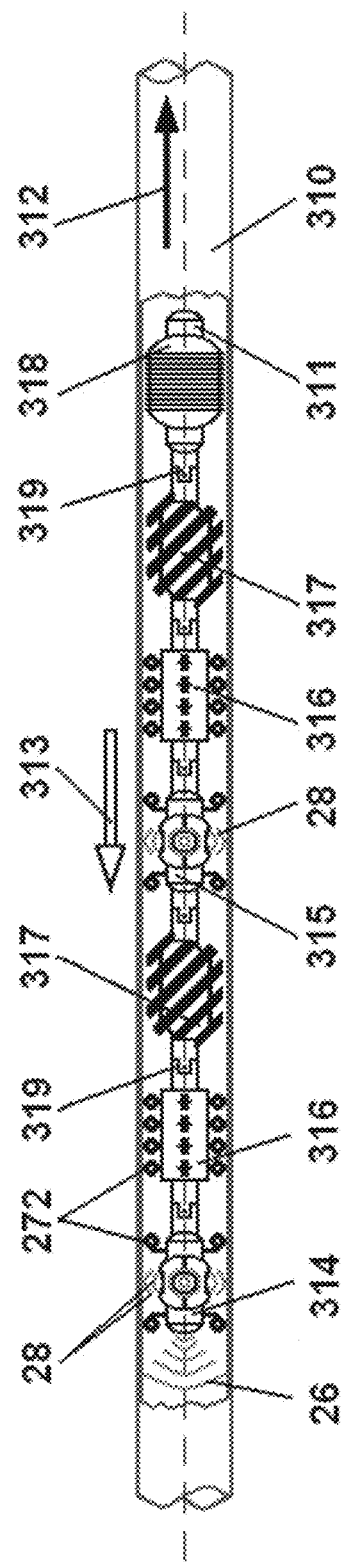
FIG. 31 is a diagram illustrating the usage of shock wave devices as part of the "pigs" used to clean unpiggable pipes, when the flow is still present.

The embodiment of FIG. 31 describes a "pig" system 311 that can be utilized for both piggable and unpiggable underground pipes 310 used in the energy and water management industries, which incorporates shock wave modules 314 and 315. This is a modular system that has its modules connected by joints 319, which provides maneuverability around tight bends and flexibility in choosing the right modules for a specific situation. The "pig" system 311 has a travel direction 313 against the fluid flow direction 312, and it is designed to allow fluid flow around it during cleaning operation. The "pig" system 311 includes turbine modules 317, which use the fluid flow from the pipe to produce energy for traction modules 316 or shock wave modules 314 and 315 of the "pig" system 311. The traction modules 316 have motors that actuate the spring-loaded rollers 272, to accommodate to variations in pipe dimensions. The first module of the "pig" system 311 is the frontal and lateral shock wave module 314 capable of generating frontal focused shock waves 26 and lateral focused shock waves 28, via a total of five (5) reflectors (one (1) frontal and four (4) radial separated from each other by 90 degrees). The frontal and lateral shock wave module 314 is the "workhorse" of the system, by simultaneously taking care of the lateral deposits and possible occlusions in the pipe. The lateral shock wave module 315 that is positioned in the middle of the "pig" system 311 can provide only lateral focused shock waves 28 and it is used to continue the elimination of pipe deposits that were not removed by the frontal and lateral shock wave module 314. Finally, at the end of the "pig" system 311 there is a mechanical cleaning module 318 that it is used to mechanically clean any last remnants of pipe deposits that were not removed by the frontal and lateral shock wave module 314 or by the lateral shock wave module 315. Both the frontal and lateral shock wave module 314 and the lateral shock wave module 315 are provided with spring-loaded rollers 272, to accommodate to variations in pipe dimensions and for smooth riding. In addition a number of sensors that include contact, location, pressure and temperature, sonic and magnetic sensors are incorporated in different modules of the "pig" system 311 (not shown in FIG. 31) for broad functionality, smooth operation and to provide continuous remote monitoring and control by the surface crew.

Figure 32:
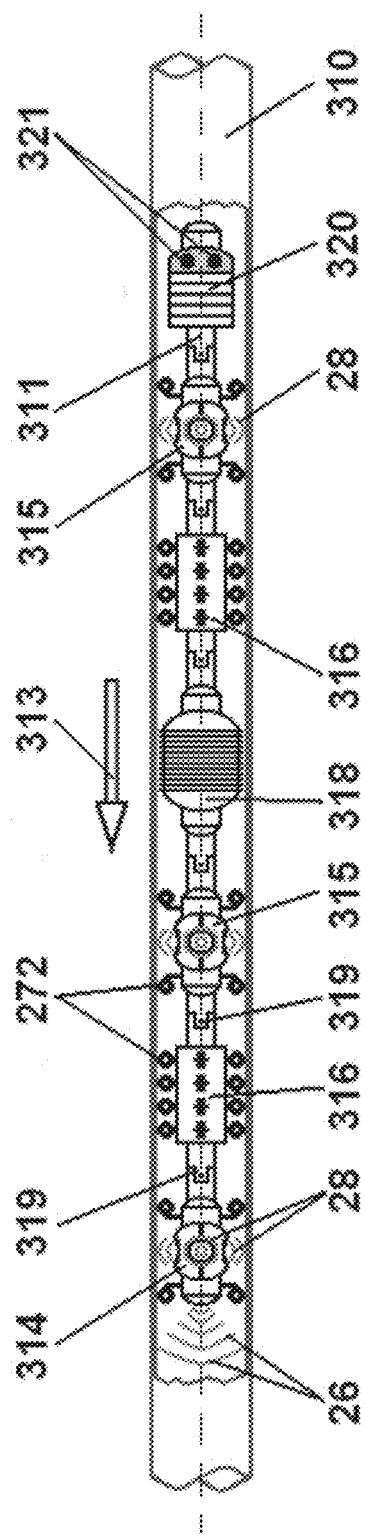
FIG. 32 is a diagram illustrating the usage of shock wave devices as part of the "pigs" used to clean unpiggable pipes, when the flow is interrupted.

The embodiment of FIG. 32 describes a "pig" system 311 that can be utilized for both piggable and unpiggable underground pipes 310 used in the energy and water management industries, when the flow through the pipe is interrupted. In general, 75 to 95% of the shock wave's energy is transmitted into the solids at the water-to-solid interface and less than 0.1% of the shock wave's energy at the water-to-air interface, which gives reduced efficiency of the shock waves produced in water that need to propagate into a gas medium. In the case of pipes that have the fluid flow interrupted during the pigging process, the medium for transmitted shock waves is air or some remaining stagnant water/fluid. This means that only the embodiments presented in FIG. 10 and FIG. 14 can be used in the construction of the shock wave devices 314 and 315 incorporated in "pig" system 311, due to the fact that the shock waves are not transferred from water to air and rather from pressurized air or solid piezoelectric crystals/fibers into air, which eliminates the 99.9% loss mentioned above. Alternatively, if the pigging operation is done on a segment of pipe between two shut-off valves, after the interruption of fluid flow through the pipe, the isolated pipe segment can be completely flooded with water, which allows the usage of any of the embodiments presented in FIG. 7, FIG. 8, FIG. 9, FIG. 10, FIG. 12, FIG. 13 and FIG. 14 for the shock wave devices 314 and 315.

The "pig" system 311 from FIG. 32 can be energized from external sources via cables (not shown) or from internal batteries. Traction modules 316, incorporating motors that actuate the spring-loaded rollers 272, are used to propel this "pig" system 311. Frontal and lateral shock wave module 314 and lateral shock wave modules 315 are utilized to clean the pipes employing frontal focused shock waves 26 and lateral focused shock waves 28. A mechanical cleaning module 318 is also used to help with debris removal from the pipe. The whole "pig" system 311 is modular with its modules connected by joints 319 and it moves in the travel direction 313 through the piggable and unpiggable underground pipe 310. In order to check the quality of the cleaning effort, the "pig" system 311 has a camera module 320 at its end. For visualization inside the pipes, the camera module 320 has LED lights incorporated into it.

Figure 33:
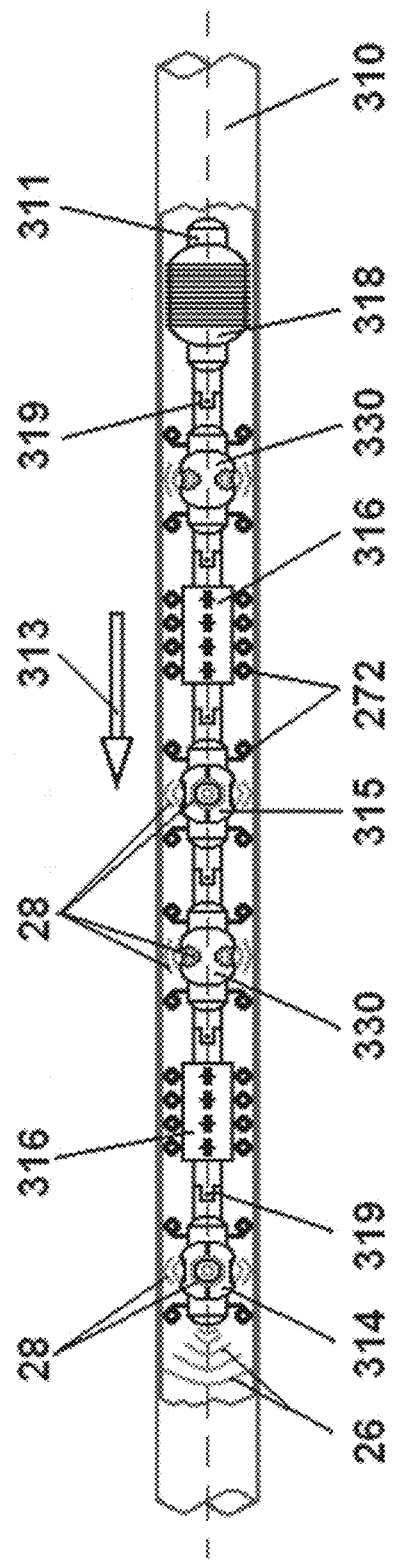
FIG. 33 is a diagram illustrating the usage of shock wave devices as part of the "pigs" used to clean unpiggable pipes, when the flow is interrupted and consecutive shock wave devices are offset with 45 degrees.

The embodiment of FIG. 33 describes a "pig" system 311 that includes additional shock wave modules, which can be utilized for both piggable and unpiggable underground pipes 310 used in the energy and water management industries, when the flow through the pipe is interrupted. For a more uniform cleaning of the piggable and unpiggable underground pipes 310, besides the frontal and lateral shock wave module 314 and the lateral shock wave module 315, a new 45 degrees offset lateral shock wave module 330 is used. With this construction of the "pig" system 311, shock wave reflectors are disposed at 45 degrees increments around the circumference of the pipe. The rest of practical aspects of functionality, applicability, and modularity are similar to those presented for the embodiments from FIG. 31 and FIG. 32.

For all three embodiments presented in FIG. 31, FIG. 32 and FIG. 33 the movement of the "pig" system 311 inside the piggable and unpiggable underground pipes 310, is controlled by the surface crew via the traction modules 316 using the information from positional sensors attached to the "pig" system 311. The speed of the movement and the pattern of the movement are adequately chosen to cover all the surface of the pipes during cleaning process.

In the case of well/production bores 22 (see FIG. 6) cleaning during workovers, the "pig" system 311 can be suspended by cables or using supporting columns 160 (see FIG. 16, FIG. 17, FIG. 20, FIG. 21, FIG. 22, FIG. 23, FIG. 24, FIG. 25, FIG. 26 and FIG. 27) that allow the longitudinal movement 162 and rotational movement 164 to help with complete cleaning of the well/production bore 22.

For elimination of the ice plugs occurring inside the underground pipes located in the arctic environment, the primary role is played by the frontal and lateral shock wave module 314, which can break the ice using especially the frontal focused shock waves 26. The ice is disintegrated by the combination of the high compressive pressure waves, cavitational jets, and the high transient temperatures that are generated during collapse of cavitational bubbles produced by shock waves. The "pig" system 311 used for this purpose should also incorporate traction modules 316 and a camera module 320 at its end.

Figure 34:
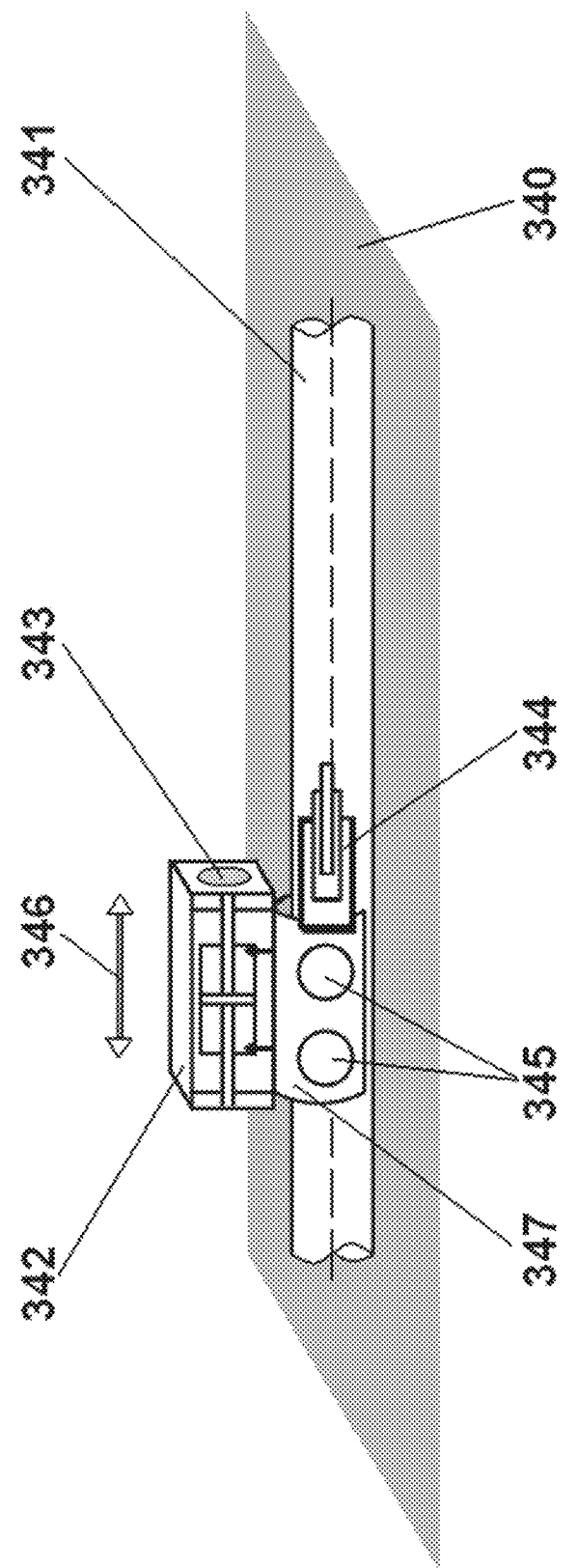
FIG. 34 is a diagram illustrating the usage of external shock wave devices to clean underwater unpiggable pipes using a longitudinal motion relatively to the pipe.

The embodiment of FIG. 34 describes the usage of an underwater cleaning robot 342 for clogged piggable and unpiggable underwater pipes 340 used in the energy and water management industries. The underwater cleaning robot 342 has four (4) or more shock wave cleaning applicators 345, capable of sending shock waves through the pipe that can dislodge the accumulations from inside the piggable and unpiggable underwater pipes 340. The underwater cleaning robot movement 346 is back and forth, which allows a thorough cleaning of the deposits accumulated in the piggable and unpiggable underwater pipe 340. The precise movement of the underwater cleaning robot movement 346 is controlled via propulsion propellers 353, actuated electrically or via nitrogen gas. The underwater cleaning robot 342 can be a custom made design or an existing commercial device that has the means to attach the lower structure/module 347 containing the shock wave cleaning applicators 345. Due to the fact that the piggable and unpiggable underwater pipes 340 sit directly on the sea floor 340, the underwater cleaning robot 342 can only have access to the top part of the pipe. This requires that the shock wave cleaning applicators 345 are powerful, with deep penetration and oriented in such way to reach the bottom of the piggable and unpiggable underwater pipes 340. This can be accomplished with shock waves that are directed in the vertical plane at any angle between 0 and 70 degrees from the horizontal plane. This can be accomplished by positioning the shock wave cleaning applicators 345 at the desired angle inside the structure/module 347 before usage or positioned under motorized control, via stepper motors, to allow a change in position during cleaning by remote control. In order to assess the quality of the cleaning from inside the piggable and unpiggable underwater pipes 340 an ultrasound vision system 344 is employed. The ultrasound vision system 344 is a module that can be easily attached to the structure/module 347 and that can also carry the shock wave cleaning applicators 345. The underwater cleaning robot 342 can be in direct contact with the piggable and unpiggable underwater pipes 340 or can have a small layer of water in between since water is a very good conductive media for shock waves. Positional sensors are used by the underwater cleaning robot 342 to determine precisely its position on top of the piggable and unpiggable underwater pipes 340, to accurately control the cleaning process.

The same embodiment presented in FIG. 34 can be also used to eliminate ice plugs created in underwater pipes 340 located in an arctic environment. The functionality and control is similar to those presented for cleaning the piggable and unpiggable underwater pipes 340.

Shock wave devices can also be used in water treatment installation to break the sludge accumulated during water cleaning at the bottom of the treatment tanks. The objective is to break the sludge into minute particles, which allows the dispersion of the sludge and thus increases the enzyme activity/biological degradation that produces less sludge needed to be disposed. This is a process similar to the ones presented above for cleaning membranes/filters or the piggable or unpiggable pipes, with the difference that the action in this case takes place in large stationary tanks that are used in water treatment plants.

All embodiments that were presented above for maintenance and cleaning of energy and water installations require a high longevity/functional life, which dictates a rugged and waterproof construction, and various modalities to generate shock waves while minimizing the exchange of equipment for function or maintenance. Any of the embodiments presented above can be used as presented or in different combinations, which is based on the complexity and characteristics of each specific application. This can be accomplished via the reflector's design, combination of different reflectors, the number of reflectors per each device, the total number of number devices, etc. Of course, the dosage of the shock waves (number of shock waves, frequency and energy setting) will also dictate the efficiency for maintenance and cleaning of energy and water installations. Being mobile devices that deliver energy for different areas based on the specific application, the best way to express the energy output is through the energy flux density expressed in mJ/mm$^2$. These devices should be capable of having an output of 0.6 up to 100 mJ/mm$^2$.

What we claim is:

1. An apparatus for separating a substance from water comprising:
   an ellipsoidal enclosure containing a mixture including the substance and water;
   an inlet conduit into the enclosure;
   an upper substance conduit near a top of the enclosure;
   a lower water conduit near a bottom of the enclosure; and
   one more shock wave devices positioned at the bottom of the enclosure to apply shock waves to separate substance from the mixture and push substance to the upper substance conduit.

2. The apparatus of claim 1, wherein the substance is oil.

3. The apparatus of claim 2, further comprising a water pump coupled to the water conduit and an oil pump coupled to the upper substance conduit.

4. The apparatus of claim 3, further comprising an automatic controller coupled to a mixture valve connected to the inlet conduit, an oil valve connected to the upper substance conduit and a water valve connected to the lower water conduit.

5. The apparatus of claim 2, wherein the one or more shock wave devices are configured to produce focused shock waves.

6. The apparatus of claim 5, further comprising a water pump coupled to the lower water conduit and an oil pump coupled to upper substance conduit.

7. The apparatus of claim 6, further comprising an automatic controller coupled to a mixture valve connected to the inlet conduit, an oil valve connected to the upper substance conduit and a water valve connected to the lower water conduit.

8. The apparatus of claim 1, wherein the one or more shock wave devices are configured to produce focused shock waves.

9. The apparatus of claim 1, further comprising a water pump coupled to the lower water conduit and an oil pump coupled to the upper substance conduit.

10. The apparatus of claim 9, further comprising an automatic controller coupled to a mixture valve connected to the inlet conduit, an oil valve connected to the upper substance conduit and a water valve connected to the lower water conduit.

11. The apparatus of claim 1, wherein the at least one shock devices includes two or more shock wave devices having different sizes.

12. The apparatus of claim 1, further comprising:
   a water pump coupled to the lower water conduit;
   an oil pump coupled to the upper substance conduit;
   an automatic controller coupled to a mixture valve connected to the inlet conduit, a valve connected to the upper substance conduit; and
   a water valve connected to the lower water conduit.

13. A method for separating a substance from water comprising:
   providing a mixture of water and a substance into an ellipsoidal enclosure, wherein the enclosure includes an upper substance conduit near a top of the enclosure and a lower water conduit near a bottom of the enclosure;
   applying focused shock waves upward from the bottom of the enclosure to the mixture to separate the substance from the water so that the substance is moved toward the top of the enclosure; and
   removing the substance from the upper substance conduit and the water from the lower water conduit.

14. The method of claim 13, further comprising applying said shock waves with a plurality of shock wave devices of different sizes.

15. The method of claim 14, further comprising pumping the substance from the upper substance conduit and pumping the water from the lower water conduit.

16. The method of claim 15, wherein the substance is oil.

17. The method of claim 14, wherein the substance is oil.

18. The method of claim 13, further comprising providing the mixture of water and a substance from a pressurized fluid mixture.

19. The method of claim 18, wherein the substance is oil.

20. The method of claim 13, wherein the substance is oil.

* * * * *

UNITED STATES PATENT AND TRADEMARK OFFICE
CERTIFICATE OF CORRECTION

Page 1 of 1

PATENT NO. : 11,072,997 B2
APPLICATION NO. : 16/365808
DATED : July 27, 2021
INVENTOR(S) : Iulian Cioanta et al.

It is certified that error appears in the above-identified patent and that said Letters Patent is hereby corrected as shown below:

In the Claims

Claim 1, Column 35, Line 15: "one more shock wave devices positioned at the bottom of" should read --one or more shock wave devices positioned at the bottom of--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*